United States Patent
Kumar et al.

(10) Patent No.: US 7,295,116 B2
(45) Date of Patent: Nov. 13, 2007

(54) ARCHITECTURE, PROGRAMMING MODEL AND API'S

(75) Inventors: Anush Kumar, Seattle, WA (US); Janaki Ram Goteti, Hyderabad (IN); Mohamed Fakrudeen Ali Ahmed, Coimbatore (IN); Abhishek Agarwal, Hyderabad (IN); Balasubramanian Sriram, Sammamish, WA (US); Ramachandran Venkatesh, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 289 days.

(21) Appl. No.: 11/069,459

(22) Filed: Mar. 1, 2005

(65) Prior Publication Data

US 2006/0058987 A1 Mar. 16, 2006

Related U.S. Application Data

(60) Provisional application No. 60/606,281, filed on Sep. 1, 2004, provisional application No. 60/606,577, filed on Sep. 2, 2004.

(51) Int. Cl.
*G08B 13/14* (2006.01)
(52) U.S. Cl. .................... 340/572.1; 235/375
(58) Field of Classification Search ........... 340/572.1, 340/572.7; 235/375, 385
See application file for complete search history.

(56) References Cited

U.S. PATENT DOCUMENTS

| | | | |
|---|---|---|---|
| 5,650,768 A * | 7/1997 | Eswaran | 340/572.1 |
| 6,631,363 B1 | 10/2003 | Brown et al. | |
| 6,732,923 B2 * | 5/2004 | Otto | 235/383 |
| 6,784,802 B1 * | 8/2004 | Stanescu | 340/687 |
| 2002/0059471 A1 | 5/2002 | Sanghvi et al. | |
| 2002/0170952 A1 | 11/2002 | Alsafadi et al. | |
| 2003/0144926 A1 | 7/2003 | Bodin et al. | |
| 2003/0225928 A1 | 12/2003 | Paul | |
| 2003/0227392 A1 | 12/2003 | Ebert et al. | |
| 2004/0215667 A1 | 10/2004 | Taylor et al. | |
| 2005/0092825 A1 | 5/2005 | Cox et al. | |
| 2005/0150953 A1 | 7/2005 | Alleshouse | |

FOREIGN PATENT DOCUMENTS

WO 03102845 12/2003

OTHER PUBLICATIONS

U.S. Appl. No. 60/606,281, filed Sep. 1, 2004, Kumar et al.
U.S. Appl. No. 60/606,577, filed Sep. 2, 2004, Kumar et al.

(Continued)

*Primary Examiner*—John Tweel, Jr.
(74) *Attorney, Agent, or Firm*—Amin, Turocy & Calvin, LLP

(57) ABSTRACT

The subject invention provides a system and/or a method that facilitates employing a model based at least upon a framework, wherein the model can be utilized to build an RFID application. A receiver component can receive data, wherein a model component can create a model based at least in part upon the received data that facilitates creating and/or executing the RFID application. The framework can be, but is not limited to, an entity, a framework class, a hierarchical framework of at least one class, an interface, an exception, a component architecture, a schema, an object model, and/or an API (Application Programming Interface). The model can be utilized to create, deploy, manage, and/or execute the RFID application to provide a generic operation and/or a business specific scenario.

20 Claims, 15 Drawing Sheets

OTHER PUBLICATIONS

U.S. Appl. No. 11/025,702, filed Dec. 29, 2004, Kumar et al.
U.S. Appl. No. 11/061,337, filed Feb. 18, 2005, Kumar et al.
U.S. Appl. No. 11/061,356, filed Feb. 18, 2005, Kumar et al.
U.S. Appl. No. 11/141,619, filed May 31, 2005, Kumar et al.
U.S. Appl. No. 11/140,726, filed May 31, 2005, Agarwal et al.
U.S. Appl. No. 11/141,533, filed May 31, 2005, Kumar et al.
U.S. Appl. No. 11/061,337, filed Mar. 1, 2005, Kumar et al.
European Search Report dated Oct. 4, 2006 and mailed Apr. 11, 2006 for EP 05108005, 9 pages.
European Search Report dated Mar. 9, 2006 mailed Mar. 22, 2006 for European Patent Application Serial No. EP05107794, 7 Pages.
ANONYMOUS: "The Sun Global RFID Betwork Vision: Connecting Businesses at the Edge of Network" Internet Article, Jul. 2004, http://www.sun.com/software/solutions/rfid/Sun_RFIS_Vision_rla.pdf.
European Search Report dated May 11, 2006, mailed May 12, 2006 for European Patent Application Serial No. EP05107744, 9 pages.
European Search Report dated Mar. 9, 2006, mailed Mar. 27, 2006 for European Patent Application Serial No. EP05107744, 7 pages.
Floerkemier, et al. "PML Core Specification 1.0" Sep. 13, 2003, Auto-ID Center, Version 1.0, 48 pages.

* cited by examiner

ARCHITECTURE, PROGRAMMING MODEL AND API'S

CROSS-REFERENCE TO RELATED APPLICATION(S)

This application claims the benefit of U.S. Provisional Patent Application Ser. No. 60/606,281 filed on Sep. 1, 2004, entitled "SYSTEM AND METHODS THAT FACILITATE RFID SERVER PROGRAMMING MODEL AND API'S," and U.S. Provisional Patent Application Ser. No. 60/606,577 filed on Sep. 2, 2004, entitled "FACILITATE RFID SERVER PROGRAMMING MODEL AND API's." This application is also related to co-pending U.S. patent application Ser. Nos. 11/025,702, 11/061,356, and 11/061,337, filed on Dec. 29, 2004, Feb. 18, 2005, and Feb. 18, 2005, respectively. The entireties of these applications are incorporated herein by reference.

TECHNICAL FIELD

The subject invention generally relates to radio frequency identification (RFID), and more particularly to a system and/or a method that generates a framework to create and/or execute an RFID application.

BACKGROUND OF THE INVENTION

Many retail, manufacture, and distribution establishments are applying different and innovative operating methods to increase efficiency. These establishments can monitor store inventory to facilitate optimizing supply and demand relating to consumers. One aspect of maximizing profit hinges on properly stocking inventory such that replenishment occurs in conjunction with exhaustion of goods and/or products. For example, a retailer selling a computer and/or a VCR, must stock the computer in relation to its consumer sales, and the VCR in relation to its consumer sales. Thus, if the computer is in higher demand (e.g., more units sold) than the VCR, the retailer can stock the computer more frequently in order to optimize supply and demand, and in turn, profit. Monitoring inventory and associated sales can be a complex task, wherein product activity is comparable to a black box since inner workings are unknown; yet monitoring products is a crucial element in inventory/product efficiency.

Automatic identification and data capture (AIDC) technology, specifically, Radio Frequency Identification (RFID) has been developed based at least upon the need to cure deficiencies of typical monitoring systems and/or methodologies (e.g., barcode readers, barcodes, and/or UPCs). RFID is a technique of remotely storing and retrieving data utilizing RFID tags. Since RFID systems are based upon radio frequency and associated signals, numerous benefits and/or advantages precede traditional techniques in monitoring products. RFID technology does not require a line of sight in order to monitor products and/or receive signals from RFID tags. Thus, no manual scan is necessary wherein the scanner is required to be in close proximity of the target (e.g., product). Yet, range is limited in RFID based upon radio frequency, RFID tag size, and associated power source. Additionally, RFID systems allow multiple reads within seconds providing quick scans and identification. In other words, an RFID system allows a plurality of tags to be read and/or identified when the tags are within a range of an RFID reader. The capability of multiple reads in an RFID system is complimented with the ability of providing informational tags that contain a unique identification code to each individual product.

Moreover, RFID systems and/or methodologies provide real-time data associated to a tagged item. Real-time data streams allow a retailer, distributor, and/or manufacturer the ability to monitor inventory and/or products with precision. Utilizing RFID can further facilitate supplying products on a front-end distribution (e.g., retailer to consumer) and a back-end distribution (e.g., distributor/manufacturer to retailer). Distributors and/or manufacturers can monitor shipments of goods, quality, amount, shipping time, etc. In addition, retailers can track the amount of inventory received, location of such inventory, quality, shelf life, etc. The described benefits demonstrate the flexibility of RFID technology to function across multiple domains such as, front-end supply, back-end supply, distribution chains, manufacturing, retail, automation, etc.

An RFID system consists of at least an RFID tag and an RFID transceiver. The RFID tag can contain an antenna that provides reception and/or transmission to radio frequency queries from the RFID transceiver. The RFID tag can be a small object, such as, for example, an adhesive sticker, a flexible label and integrated chip, etc. There are typically four different frequencies the RFID tags utilize: low frequency tags (between about 125 to 134 kilohertz), high frequency tags (about 13.56 megahertz), UHF tags (about 868 to 956 megahertz) and Microwave tags (about 2.45 gigahertz).

In general, an RFID system can include multiple components: tags, tag readers (e.g., tag transceivers), tag writers, tag-programming stations, circulation readers, sorting equipment, tag inventory wands, etc. Moreover, various makes, models, types, and/or applications can be associated with respective components (e.g., tag, tag readers, tag programming stations, circulation readers, sorting equipment, tag inventory wands, . . . ), which can complicate discovery, configuration, setup, communication, maintenance, security, and/or compatibility within the RFID system and with other RFID systems. In view of the above, there is a need to provide a uniform way to discover, configure, setup, and communicate to RFID devices in respect to the maker and associated specifications.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The subject invention relates to systems and/or methods that facilitate implementing a model that can be utilized to create an RFID process at design time and execute the RFID process at run time. A receiver component can receive data, wherein a model component can create a model, based at least in part upon the received data, that facilitates creating the RFID application at design time and executing the RFID application at run time. The receiver component can obtain data such as, but is not limited to, an external input (e.g., end-user input, application developer input, etc.), device related data (e.g., antennae data, configuration data, an identification, an address, a version, etc.), provider related data, tag data, a device collection, a filter policy, an alert policy, a logical source (e.g., wherein a logical source can comprise of a device collection(s), optional filter and/or alert policies, and/or optional event handler), an event handler, an event, etc. The model created by the model component can be utilized to facilitate creating, deploying, executing, and/or maintaining the RFID process. Furthermore, the model component can utilize an event processing pipeline, wherein a pipeline event can utilize a processing node. The pipeline event processing nodes can be at least one of a filter (e.g., an invalid tag, a duplicate tag, a removed tag, etc.), an alert (e.g., a theft detection, a blank tag, etc.), and an event handler (e.g., an internal movement, a business context, etc.). The event can get enriched and/or populated with data as it progresses through the pipeline.

In accordance with one aspect of the subject invention, the model component can utilize a framework (which can be, but is not limited to, an entity (e.g., a device, a logical source, a filter policy, an alert policy, an event handler, a tracker, a write handler, an RFID process object, a store, etc.), a framework class, a hierarchical framework of at least one class, an interface, an exception, a component architecture, a schema, an object model, an application programming interface (API), . . . ) that facilitates creating and executing an RFID process. The logical source can represent a stream of reads from a physical device on a server that brings an entity together and can represent processing tag data within the RFID process. It is to be appreciated that the model component can encompass at least one of the following device management, provider management, store management, health monitoring, process design, process deployment, and runtime.

In accordance with another aspect of the subject invention, the model component can create and/or execute various RFID applications such as, but are not limited to, a manufacturing process (e.g., writing to a tag on a product leaving manufacturing, etc.), an outbound process (e.g., a selection of a specifically tagged product, a packed selection of a specifically tagged product, a shipment of a selection of specifically tagged product, receiving a specifically tagged product, etc.), a business associated process, a generic operation, etc.

In accordance with yet another aspect of the subject invention, the model component can include an object model component that creates an object model and/or application programming interface (API) to facilitate utilizing a model that is based upon a framework. The model component can invoke the object model, which can be, but is not limited to, an RFID process OM, an RFID process execution OM, a server manager OM, a discovery OM, a store OM, and an authorization OM. It is to be appreciated and understood that the model component can encompass at least one of the following device management, provider management, store management, health monitoring, process design, process deployment, and runtime. The OM created can be utilized to facilitate the creation and/or execution of the RFID process during design time and run time respectively.

In accordance with still another aspect of the subject invention, a method provides an instantiation of a framework to allow a creation of an RFID process at design time and an execution of the RFID process at run time. Thus, the instantiation, the creation, and execution of the RFID process can be implemented utilizing the model. Additionally, a method is employed by the subject invention that facilitates creating, deploying and managing a logical RFID process as well as a physical device in a uniform manner. Moreover, a method and/or system are provided by the subject application to encompass an RFID process lifecycle.

The following description and the annexed drawings set forth in detail certain illustrative aspects of the invention.

These aspects are indicative, however, of but a few of the various ways in which the principles of the invention may be employed and the subject invention is intended to include all such aspects and their equivalents. Other advantages and novel features of the invention will become apparent from the following detailed description of the invention when considered in conjunction with the drawings.

DESCRIPTION OF THE INVENTION

Figure 1:
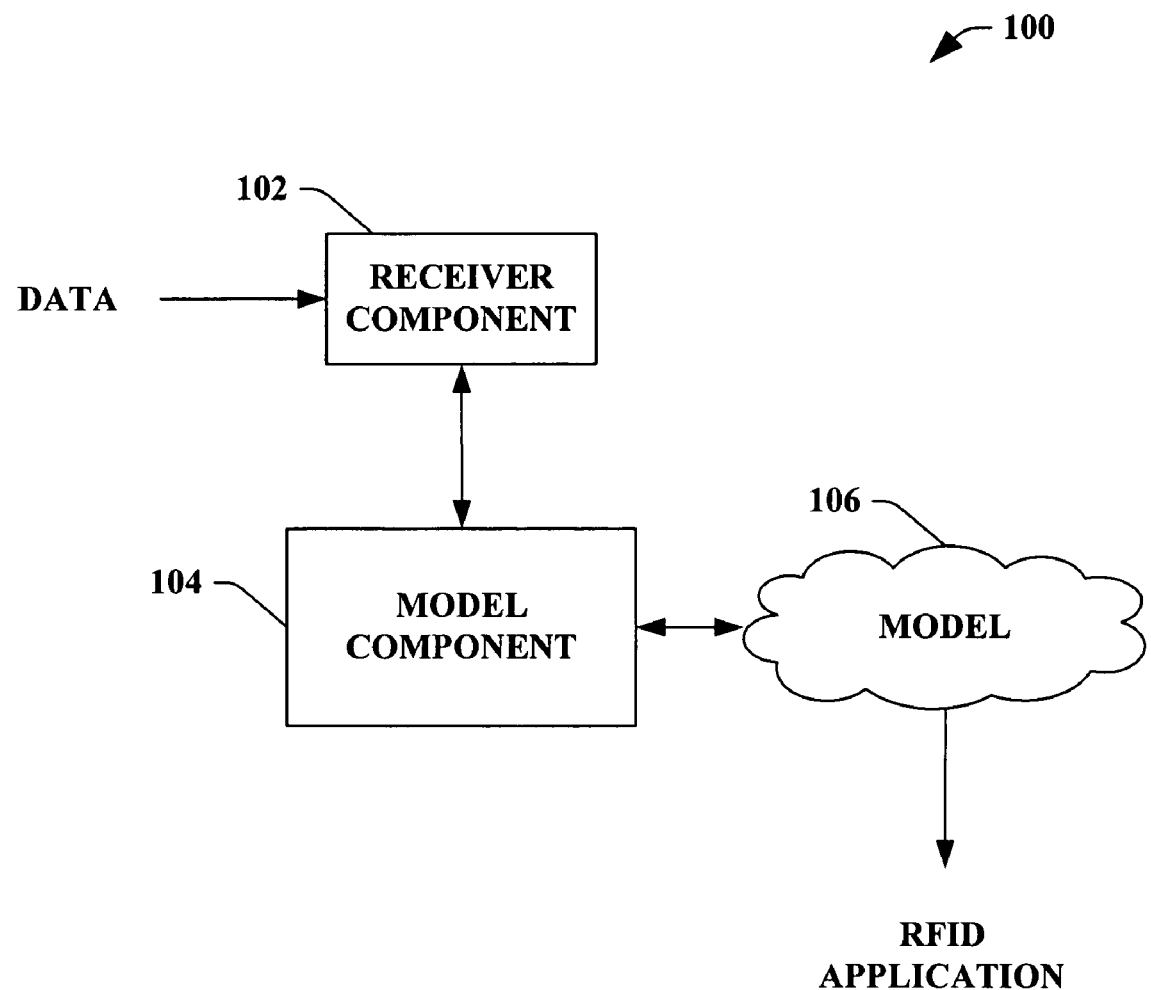
FIG. 1 illustrates a block diagram of an exemplary system that facilitates employing a model to create and/or execute an RFID application.

As utilized in this application, terms "component," "system," "framework," "object model," "model," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

The subject invention is described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

Now turning to the figures, FIG. 1 illustrates a system 100 that facilitates employing a model based at least upon a framework, which can be utilized to build an RFID application. A receiver component 102 can receive data and convey the data to a model component 104, which can create a model 106 based at least in part upon the data. The model 106 can be employed to facilitate creating the RFID application. The receiver component 102 can obtain data such as, but not limited to, an external input (e.g., end-user input, application developer input, etc.), device related data (e.g., antennae data, configuration data, an identification, an address, a version, etc.), provider related data, tag data, a device collection, a filter policy, an alert policy, a logical source (e.g., wherein a logical source can comprise of a device collection(s), optional filter and/or alert policies, and/or optional event handler), an event handler, an event, etc. Although the receiver component 102 depicted is shown as a separate component, it is to be appreciated that the receiver component 102 can be incorporated into the model component 104, and such illustration (e.g., albeit incorporated into another component or a stand alone component) should not be seen as a limitation.

The model 106 can be utilized to create the RFID application that provides generic operations and/or business specific scenarios. For instance, various RFID applications can be created based at least upon the model 106 such as, but not limited to, a manufacturing process (e.g., writing to a tag on a product leaving manufacturing, etc.), an outbound process (e.g., a selection of a specifically tagged product, a packed selection of a specifically tagged product, a shipment of a selection of specifically tagged product, receiving a specifically tagged product, etc.), a business associated process, etc. It is to be appreciated that the model component 104 can create a plurality of RFID applications having various characteristics and/or specifications relating to the received data. Furthermore, the model component 104 can build the RFID applications atop the OM (e.g., utilize the OM exposed by the framework) to satisfy their functionality.

Furthermore, the model component 104 can create the model 106 such that at least one framework, which can be utilized to build at least one RFID application. It is to be appreciated that the framework can include, but is not limited to, an entity (e.g., a device, a logical source (e.g., wherein a logical source can comprise of a device collection(s), optional filter and/or alert policies, and/or optional event handler), a filter policy, an alert policy, an event handler, a tracker, a write handler, an RFID process object, a store, etc.), a framework class, a hierarchical framework of at least one class, an interface, an exception, a component architecture, a schema, an object model, an application programming interface (API), etc. For example, the receiver component 102 can receive data relating to at least one device. This device can be an RFID reader, an RFID writer, an RFID trigger, an RFID receiver, a sensor, a real time event, an RFID signal, etc. In other words, the device can be any suitable component capable of receiving a real time event, wherein the device need not be an RFID related entity. The receiver component 102 can provide the data to the model component 104. The model component 104 can generate the model 106 based at least in part upon the received data. It is to be appreciated that the model 106 can be utilized to create at least one RFID process that can provide a generic operation and/or a business specific scenario in conjunction with the at least one device. In other words, the model component 104 creates the model 106 based at least in part upon the device information. In another example, the RFID application can be a manufacturing process application. A device, such as an RFID reader/writer, can write to a tag on a pallet of goods (e.g., ready to ship to consumers). By utilizing the model 106, the RFID application can write to the tag on the pallet upon, for instance, a detection of a tag read event, an external event stimulus, etc. It is to be appreciated and understood that the framework can provide a definition of a logical layout of processing that can represent a logical process, wherein the logical process can bind to a physical device at runtime to provide a clean separation of a logical model and physical model. In other words, a developer and/or a user can write once, and deploy anywhere.

Furthermore, the model component 104 can utilize an event processing pipeline, wherein a pipeline event can utilize a processing node. The pipeline event processing nodes can be at least one of a filter (e.g., an invalid tag, a duplicate tag, a removed tag, etc.), an alert (e.g., a theft detection, a blank tag, etc.), and an event handler (e.g., an internal movement, a business context, etc.). The event can get enriched and/or populated with data as it progresses through the pipeline. For example, a source can be received by a rules engine (RE) (not shown), wherein the RE can execute a filter and/or an alert policy. The RE can then hand the source to N number of components (e.g., an EventHandler 1, EventHandler 2, . . . EventHandler N), where N is an integer greater than 1. The last component in the event processing pipeline can provide the output that is populated, and/or enriched.

It is to be appreciated that the model component 104 can be a model that utilizes an RFID process lifecycle. First, a logical source with at least one of a device collection, an event policy, and an event handler is created. Next, a custom component such as a policy and/or event handler can be implemented. Then, the logical source(s) can be connected together to create a process with a tracker, and/or security options. The device(s) can be configured, reader collections can bind in the process to a physical device, and then deployed. The information can be retrieved from the executing process/processes, managed device, and/or process. Moreover, the processes can be re-configured with dynamic policy morphing (e.g., during the running of a process).

Figure 2:
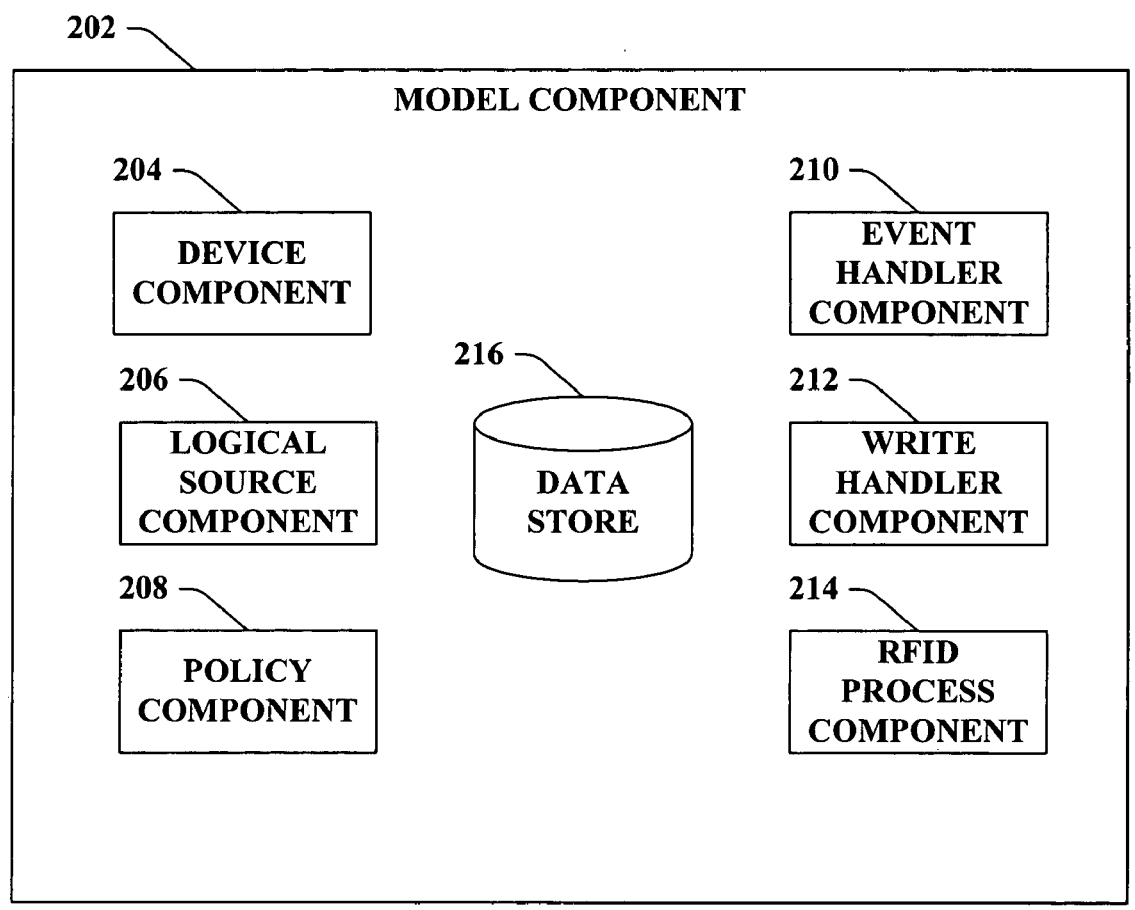
FIG. 2 illustrates a block diagram of an exemplary system that facilitates utilizing a model to implement an RFID process.

FIG. 2 illustrates a system 200 that facilitates utilizing a model to create and execute an RFID application. A model component 202 can be employed that creates a model (not shown) that facilitates building the RFID application to provide a generic operation and/or a business specific scenario. The model component 202 can include at least one entity that facilitates building and executing an RFID application/process. It is to be appreciated that the model component 202 can be substantially similar to the model component 102 as depicted in FIG. 1. Moreover, a receiver component (not shown) can receive data that can assist in creating the RFID application/process. Although not depicted, the receiver component can be, but is not limited to, an incorporated component within the model component 202, a stand-alone unit, and/or a combination thereof.

The model component 202 can include a device component 204. The device component 204 can be, but is not limited to, an RFID reader, an RFID writer, an RFID transmitter, an RFID receiver, an RFID printer, a transponder, a transceiver, etc. It is to be appreciated that a plurality of device components 204 can be incorporated into the model component 202, but for sake of brevity only one is illustrated. The device component 204 can communicate with a tag via radio waves and/or pass information in digital form to a host. Furthermore, the device component 204 can write and/or program at least one tag (e.g., if the tag is compatible to such function). The device component 204 can be discovered and/or configured to perform functions in association with the RFID application/process. Additionally, the device component 204 is configured by one of setting the device identification, naming for reference, reading triggers and/or other execution specific parameters, writing triggers and/or other execution specific parameters, etc.

In accordance with one aspect of the subject invention, the device component 204 can be an RFID printer that obtains a command from the host to execute on a tag. In contrast, typical techniques obtain information from the tag and pass the information to the host. For example, a printer can obtain a tag identification as well as a barcode, and print it on the tag.

Moreover, a selection of device components 204 can be associated to each other based at least upon a physical location. A selection of device components 204 associated to each other can form a logical device collection and/or can be designated as logical writers. It is to be appreciated that a common operation (e.g., a read trigger, a writer trigger, a transmit trigger, etc.) can be defined over one or more device components 204. For example, device components can be RFID readers at dock door A, dock door B, and dock door C. The RFID readers (e.g., device components 204) can be associated together as a device collection, which can be referenced by "Shipping Device Collections."

The model component 202 can further include a logical source component 206 that combines at least one of a device collection (e.g., the device collection contains one or more device component 204), a filter, an alert, an event handler (discussed infra), and an additional logical source(s). The logical source component 206 can represent tag data and/or how the tag data is processed in the RFID process before being passed to a sink (defined infra). It is to be appreciated the basic form of the logical source component 206 is a device collection, wherein all reads/writes from the device collection are directly sent to the sink.

The logical source component 206 can utilize a set of execution semantics utilizing at least one of the following: the device collection and/or the logical source to produce tag read events and/or a platform event; an optional filter that can consume a tag read/write event and/or filter out unwanted reads/writes; an optional alert that can consume a tag read/write event and/or an event to evaluate an alert and execute one or more actions; an optional event handler that can consume a tag read/write event and process the substantially similar tag read event. It is to be appreciated that the filter, alert, and event handler executes in an order specified by an input (e.g., via a user, an application developer, etc.) from the RFID process. For instance, a user can specify the following order and/or definition of components within a logical source component 206, where "→" signifies "is defined by": alertpolicy1→ send a message (e.g., a short message service (SMS)) to an administrator if a tag is read between X and Y, where X is associated to a date and/or time, and Y is associated to a subsequent date and/or time than X; filterpolicy1→ remove duplicate tag reads utilizing a duplicate elimination technique; eventhandler1→ if the item satisfies a condition (e.g., a coat that is grey), then enrich the data via writing to the tag; filterpolicy2→ ignore coats that are priced less than $500 (e.g., this filter is based upon data that was added by eventhandler1); alertpolicy2→ check the new coat inventory and alert an administrator of an inventory level (e.g., high or low inventory); etc. Following the previous example, the alert, the filter, and the event handler are executed in the order specified by the input and/or user. It is to be appreciated that the output of the last component in the event handler is defined as the output of the logical source component 206.

Figure 3:
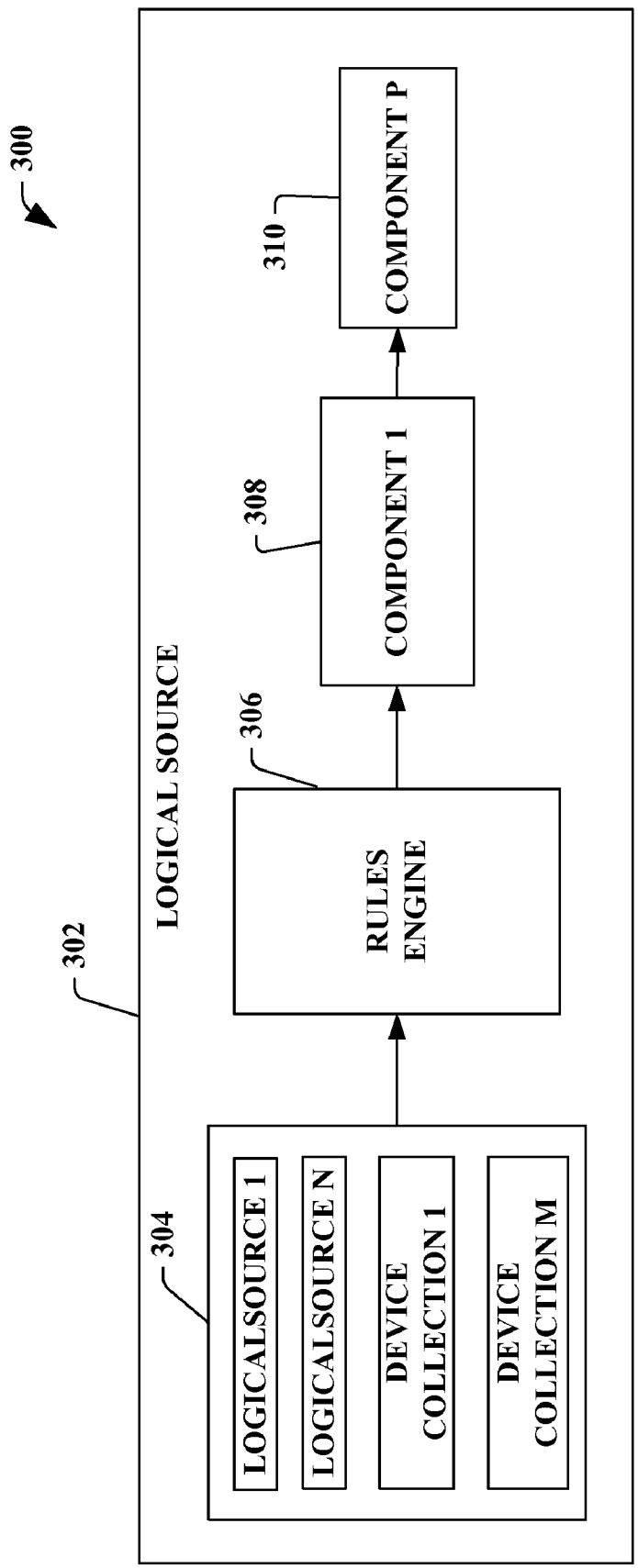
FIG. 3 illustrates a block diagram of an exemplary system that facilitates utilizing a logical source.

Turning briefly to FIG. 3, a logical source 302 is illustrated that can be utilized to create a model that is used to build an RFID application. In particular, a logical source 302 is a stream of tag reads and/or writes. The stream of reads can be processed and result in a different stream of reads. It is to be appreciated that the logical source 302 can recursively embed at least one other logical source. A group of events and/or tag reads 304 can be sent to a rules engine 306, where optional filters and/or alerts can be executed. The group of events and/or tag reads 304 can be N logical sources, where N is greater than or equal to one, and/or M device collections, where M is greater than or equal to one. After the rules engine 306, the group of events and/or tag reads 304 can be passed to a component 308. There can be N number of component 308, where N is greater than or equal to one. Moreover, the component 308 can be an event handler.

Referring back to FIG. 2, the model component 202 can include a policy component 208 that can provide an optional filter policy and/or an optional alert policy. A filter, generally, is a logical construct that is executed on incoming raw data streams and can be specified on a logical source component 206 via a set of logical rules (e.g., on an incoming tag read event) that can be grouped into a policy. A filter policy allows a list of valid tags to pass through, wherein rules in the policy are constraints that are not violated. If violated, the tag (e.g., referred to as a rogue tag) that violated the constraint is removed from the tag list. The result is a list of valid tags that have been allowed through the filter policy. For instance, Pallet/Case/Item can be a filter that allows a certain type of tag to be read by a device and/or to remove certain types of tag reads that are not required to be processed.

An alert is another mechanism to express rules that are utilized to evaluate data streams. The alerts can be expressed as a set of logical rules grouped into a policy, which are evaluated against multiple events that can include the tag read/write event. The actions associated to these rules can be one or more user-defined/alerts. For instance, an alert can be established such that if a tag read is registered between 6 P.M. and 6 A.M. by the logical source component 206, the alarm is activated and one of the following can be alerted: a supervisor, a security agency, etc. Moreover, the alert can be at least one of the following: an audible signal, a text message, a lock on a building, an email, a light, a video, a motion, etc. It is to be appreciated that the model created by the model component 202 allows a user to implement the filter and/or the alert into the system via a plug and play technique. For instance, the system can utilize a rules engine (RE) that can evaluate rules/conditions and/or take action on an event based upon the evaluation.

An event handler component 210 can additionally be included within the model component 202 to manage an event from a logical source component 206. The event handler component 210 can be utilized for at least one of the following: apply logic in real-time on tag read events and/or enrich the event in a specific manner; consume an event by a higher level application; write back to a tag when a blank tag read event is detected; etc. The event handler component 210 can specify actions when exceptions occur such as, but not limited to, a read error and a write error. It is to be understood that the exceptions can be from the logical source component 206 during execution (e.g., managing a process specific event).

In accordance with one aspect of the subject invention, the model created by the model component 202 allows custom implementations of an event handler component 210 to be defined and utilized. For example, if a rules engine (RE) does not allow implementation of a filter and/or alert, the event handler component 210 can provide such functionality. Moreover, the event handler component 210 can be implemented as a "catch-all" component that can be utilized substantially similar to a filter and/or alert. Still referring to FIG. 2, the model component 202 can include a write handler component 212 that enables the RFID process to send commands to the device component 204 based at least upon an external input, and/or events from the logical source component 206, wherein the events are a tag read event, a tag write event, and a reader health event. The event handler can also be utilized to generate an event with business context (e.g., an internal movement, a shipping event, based on custom logic/evaluation of incoming event streams as well as external data sources).

The model component 202 can include an RFID process component 214, which is an uber and/or high-level object that provides a model with a meaningful unit of execution. For instance, the RFID process component 214 can be a shipping process that represents multiple devices at various dock doors working together to perform tag reads, filtering, read enrichment, alert evaluation, and data storage in a sink for a host application to retrieve/process. In another example, the RFID process component 214 can execute a manufacturing process, wherein devices are configured to read as well as write dependent upon a location. Moreover, additional functions such as filtering, enriching, etc. can be implemented at the location. In yet another example, the RFID process component 214 can write to a tag process where the write handler component 212 writes to a tag in real-time based at least upon an input. The write process can also check if the write succeeded by reading and passing data back to the host.

The model component 202 can include a data store 216 that stores and retrieves a framework entity (e.g., a device, a device configuration, an RFID process, a mapping from the logical entity in the RFID process to a physical device). It is to be appreciated that the data store 216 can be pluggable to the user. Furthermore, the data store 216 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 216 of the subject systems and methods is intended to comprise, without being limited to, these and any other suitable types of memory. In addition, it is to be appreciated that the data store 216 can be a server and/or database. In particular, the data store 216 can be a computer that provides client computers with highly efficient access to database files.

Figure 4:
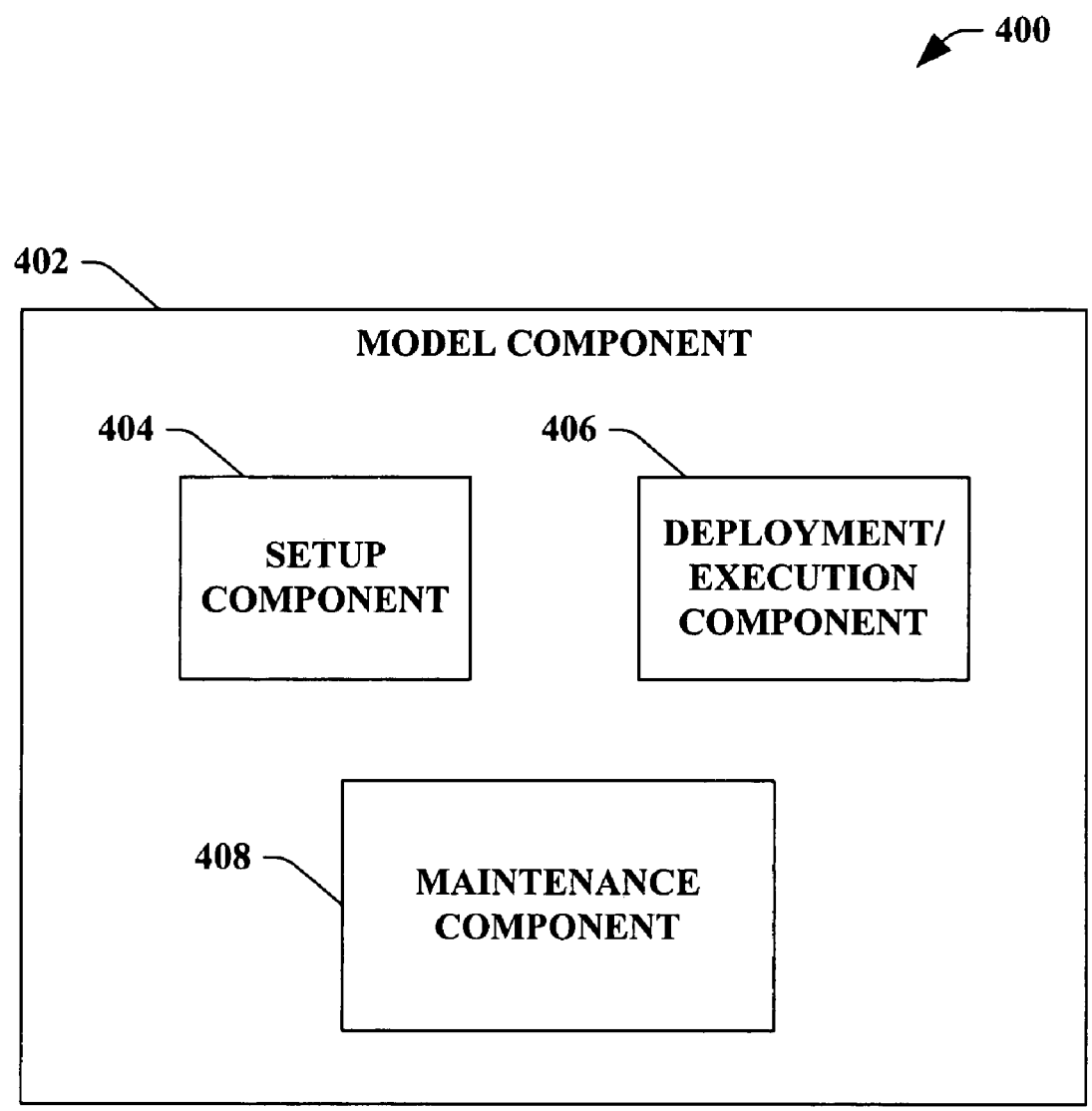
FIG. 4 illustrates a block diagram of an exemplary system that facilitates developing and creating an RFID process.

FIG. 4 illustrates a system 400 that facilitates the creation and execution of an RFID process. A model component 402 can be employed that develops a programming model (not shown) allowing the creation and/or execution of an RFID process. It is to be appreciated that the programming model can be an event-based programming model. For instance, the event-based programming model can create at least one logical RFID process, which can have a core of a declarative specification of event processing pipeline(s) (discussed supra). The event-based programming model can utilize design-time support for interacting with a logical device. Moreover, the programming model can support business logic via rules such as, but not limited to, a filter rule, an alert rule, a transform rule, etc. Additionally, the event-based programming model can provide a declarative specification of process end-points and/or deployment-time support for binding and interacting with a physical device. The model component 402 can be substantially similar to the model components 202 of FIG. 2, and 104 of FIG. 1, wherein the previously described functionality of previous components can be implemented throughout the model component 402. It is to be appreciated that the model component 402 can be employed to create the programming model to facilitate building the RFID application/process associated to a generic operation and/or a business specific scenario.

The model component 402 can include a setup component 404 that sets up and/or configures the RFID process and/or an RFID process definition are setup and/or configured. The setup component 404 initiates a device, which can be, but is not limited to, an RFID device, an RFID reader, an RFID writer, etc. The setup component 404 sets up the device by discovering at least one device. It is to be appreciated that such discovery can be, but is not limited to, an automatic discovery, a manual discovery (e.g., utilizing a configuration file), a combination thereof, etc. Furthermore, the discovery of devices utilizing the setup component 404 can be independent of the RFID process development. In accordance with one aspect of the subject invention, the setup component 404 can configure custom properties to the device. In other words, if default properties are associated of the device, such properties are not applied until the device is mapped to a device collection.

The setup component 404 can create a logical device collection and/or a logical writer in the context of the RFID process. The device collection can be grouped into a logical source, which can have optional constructs such as, but not limited to, a filter, an alert, an event handler, etc. It is to be appreciated that the optional constructs can be specified and/or configured to the logical source. The RFID process is then created by the setup component 404 by associating devices and the top-level logical source with such devices. Additionally, a tracking level and/or execution tracking option/logging level for the process can be specified.

The model component 402 can also include a deployment/execution component 406 that deploys and/or maintains at least one RFID process. It is to be appreciated that deployment can include reading of tag data and/or writing tag data. The deployment/execution component 406 deploys the RFID process by utilizing a user-defined mapping of a logical entity in the process to a physical entity in a network. The logical entity can be, but is not limited to, a device collection, a logical writer, a writer collection, a reader collection, etc. The physical entity in the network can be, but is not limited to, a device, a reader, a writer, an RFID device, a printer, etc.

In accordance with one aspect of the subject invention, the mapping can be a logical device collection within the RFID process to the physical reader device. For example, the mapping can be to one of the following: a specific reader Internet protocols (IP)(e.g., 168.192.38.21, 168.192.38.22, 168.192.38.23); a wild-card collection, (e.g., 168.192.38.*), where * is a wild-card that designates any suitable matching character; a combination of the specific IP and the wild-card (e.g., 168.192.38.21, 168.38.22, 168.192.39.*). It is to be appreciated that the implementation of a wild-card collection can be more versatile in expansion of physical devices. For instance, utilizing the wild-card, a user can assign an IP address within a wild-card collection range, wherein the mapping address is compatible to the existing RFID process. If specific IP addresses are used, such new assigned IP would need to be incorporated into the mapping.

In accordance with another aspect of the invention, the mapping can be a logical writer within the RFID process to the physical writer device. It is to be understood that a single logical writer can map to a single physical writer. The devices that do not have custom properties are configured upon a match to a logical entity (e.g., a device collection and/or logical writer). For a device that has a custom property, the default profile is applied followed by the custom profile.

The deployment/execution component 406 can further execute the RFID process. The RFID process can include readers configured to read (e.g., data gathering and evaluation/enrichment; data storage, and event handling); and writers (e.g., writing tag information and verification). The execution of the RFID process by the deployment/execution component 406 entails processing information from the device collection (e.g., devices that belong to the device collections). The processing can be, for instance, passing an event (e.g., actual RFID tags, or a reader up/down event, . . . ) through various and/or optional components (e.g., a filter, an alert, an event handler, . . . ) in a logical source. It is to be understood that an event handler can enrich and/or transform incoming data with additional fields/custom fields via a lookup to an external source and generate additional real-time event(s). The event handler can also be configured to write tag information when a tag is detected. Moreover, the processed events are stored into a sink. It is to be appreciated that the execution of the RFID process can entail sending a writer component (not shown) a command to write some data to a tag independent of a tag read event. By separating the creation and deployment of an RFID process, the model component 402 can create a programming model that enables a user/enterprise to build and deploy RFID processes in a modular and flexible manner.

Furthermore, a maintenance component 408 provides management of at least one RFID process. The RFID process management can focus on the processes defined in the RFID process execution (discussed supra) during a lifetime of such process. RFID processes can be started and stopped utilizing a process manager (not shown). In one example, the lifetime of an RFID process can be in relation to the starting and/or stopping of an operating system service. If the RFID process is running, it can be stopped, changed, and restarted while the server is running.

Figure 5:
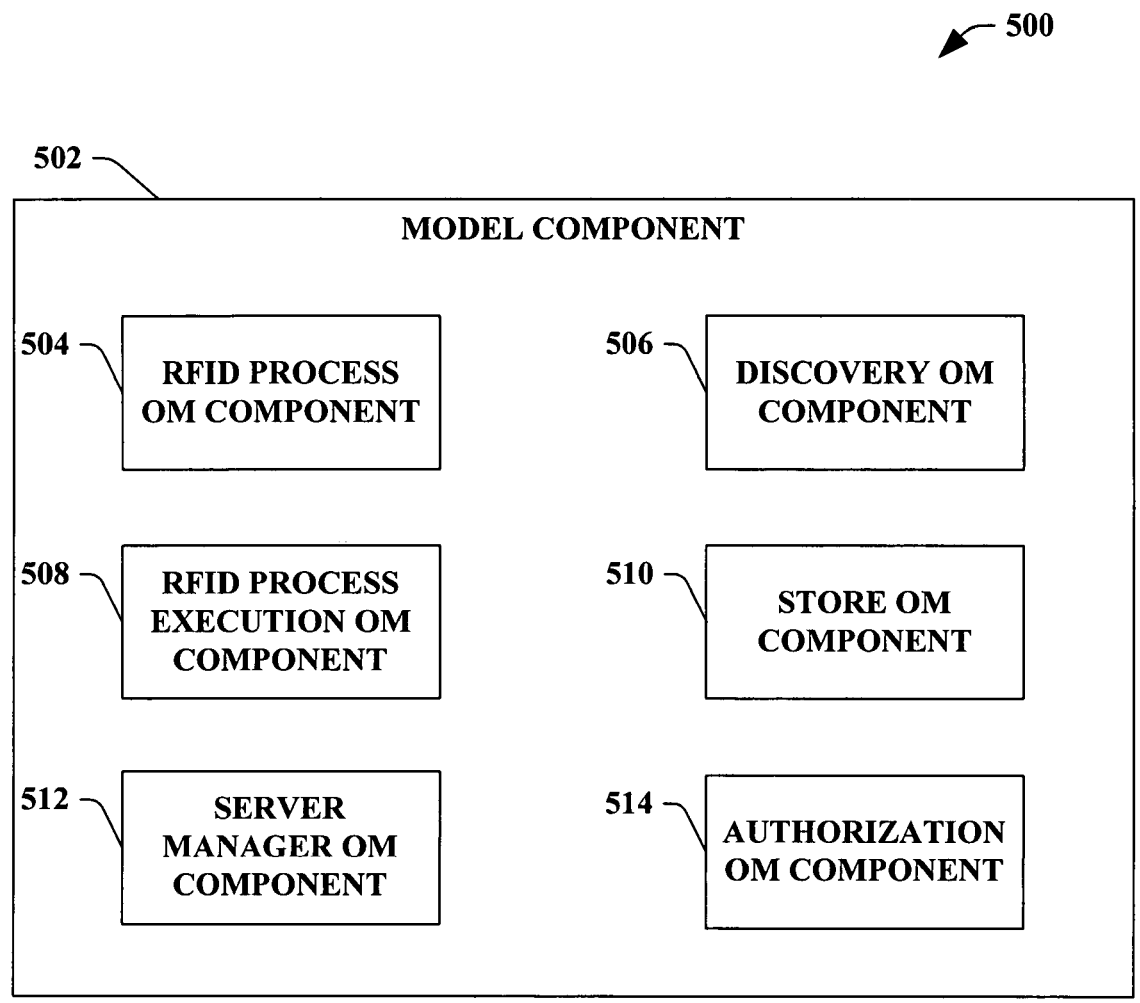
FIG. 5 illustrates a block diagram of an exemplary system that facilitates utilizing an object model to create an RFID application.

FIG. 5 illustrates a system 500 that facilitates utilizing an object model to create an RFID application. A model component 502 can be employed to create and/or execute an RFID application by utilizing an object model and/or an application programming interface (API). It is to be appreciated that the model component 502 can be substantially similar to the model components 402, 202, and 104 of FIGS. 4, 2, and 1 respectively. Furthermore, the model component 502 can create the object model and/or the API in relation to the RFID process to provide a generic operation and/or a business specific scenario.

The model component 502 can include an RFID process object model (OM) component 504 that allows a user, an end user, and/or a tool to create and/or store the RFID process. The RFID process can include, but is not limited to, the following: at least one logical source (e.g., a logical source is a logical composition and/or grouping of devices); a tracker that can be utilized to track during execution; a write handler to interact (e.g., sending custom writing and/or custom commands to a device) to the device that has write capabilities; etc.

The model component 502 can include a discovery OM component 506 that obtains meta data of a device, regardless of device type. Moreover, the discovery OM component 506 can obtain providers in the form of property meta-data. It is to be appreciated that the discovery OM component 506 can allow a user to verify if the device is valid (e.g., available for connectivity, responsive to polling, communicative, etc.). In general, the discovery OM component 506 utilizes a device handler web service interface. The device handler can allow the user to receive properties supported by a particular device, wherein the properties are valid properties that can be in the device property profile. It is also to be understood that the device handler can check if a given device is valid.

The RFID process execution component 508 can allow the end user and/or the tool to deploy the RFID process. The RFID process execution OM component 508 can have a web service interface, such as, but is not limited to, a process manager. The process manager can manage and/or control a plurality of RFID processes, wherein a process engine associated to each RFID process is managed. The management of the RFID processes can include, but is not limited to, a starting and/or a stopping of the RFID process. Furthermore, the order and/or sequence of the execution of the RFID process can be determined by the RFID process execution OM component 508.

The model component 502 can further include a store OM component 510 that provides a user with a uniform set of API's to store, retrieve and delete an RFID framework entity (e.g., an RFID process, a device, etc.). The uniform set of API's can allow the end user tool to access, store, and/or modify the RFID framework entity (e.g., an RFID process, a writer, a reader, a printer, etc.) from a persistent store in a uniform and/or consistent manner. It is to be appreciated that the API's are exposed through the store web service interface. In accordance with one aspect of the subject invention, a server can be implemented by the store OM component 510 that can contain the RFID process and a device in an appropriate table(s) within an RFID database.

The model component 502 can include a server manager OM component 512 that can manipulate an RFID server. The server manager OM component 512 can allow an external application to configure and/or manipulate (e.g., tweak) the behavior of the RFID server. In other words, the server manager OM component 512 allows a property of the RFID server to be set. It is to be appreciated that the server manager component OM 512 can manage at least one device service provider, wherein the device service provider can be substantially similar to a driver for an RFID device. The device service provider can provide a uniform interface to devices such that the RFID server can interact with the device service provider instead of specific devices. The server manager OM component 512 can include various web service interfaces such as, but not limited to, a server manager and a provider manager.

An authorization OM component 514 can be utilized by the model component 502 to authorize accessibility to at least one of the RFID process and/or the device entity. The access to the RFID process and/or the device entity can be based at least upon a list of an authorization group associated with the particular RFID process. The authorization group can include a user-defined name of the authorization group, a flag specifying read-execute/modify-delete/both access level, and a list of users/groups. In general, the authorization group can be a named object that specifies a list of RFID store users and an access level to an artifact for the users when associated with the RFID process and the device artifact. Authorization groups typically can be configured based on user roles (and/or associated views on various artifacts) in an organization such as, but are not limited to, a warehouse manager, a warehouse employee, a DC manager, a store employee, etc.

For example, if authorization is enabled when an instance of the RFID process or the device is created in a store, only the user that created it has both read-execute and modify-delete access to that artifact. The authorization OM component 514 can provide an API to associate a list of authorization groups with the RFID process or device that can override default permission on the artifact. It is to be appreciated that independent of the authorization setting on the artifact, an owner and/or administrative users can have unrestricted access to the artifact. Furthermore, the authorization group can get associated with the RFID process at a store level (e.g., apart from the method to support saving the authorization group at the store level, there can also be an associated API to associate such groups with the RFID process).

Figure 6:
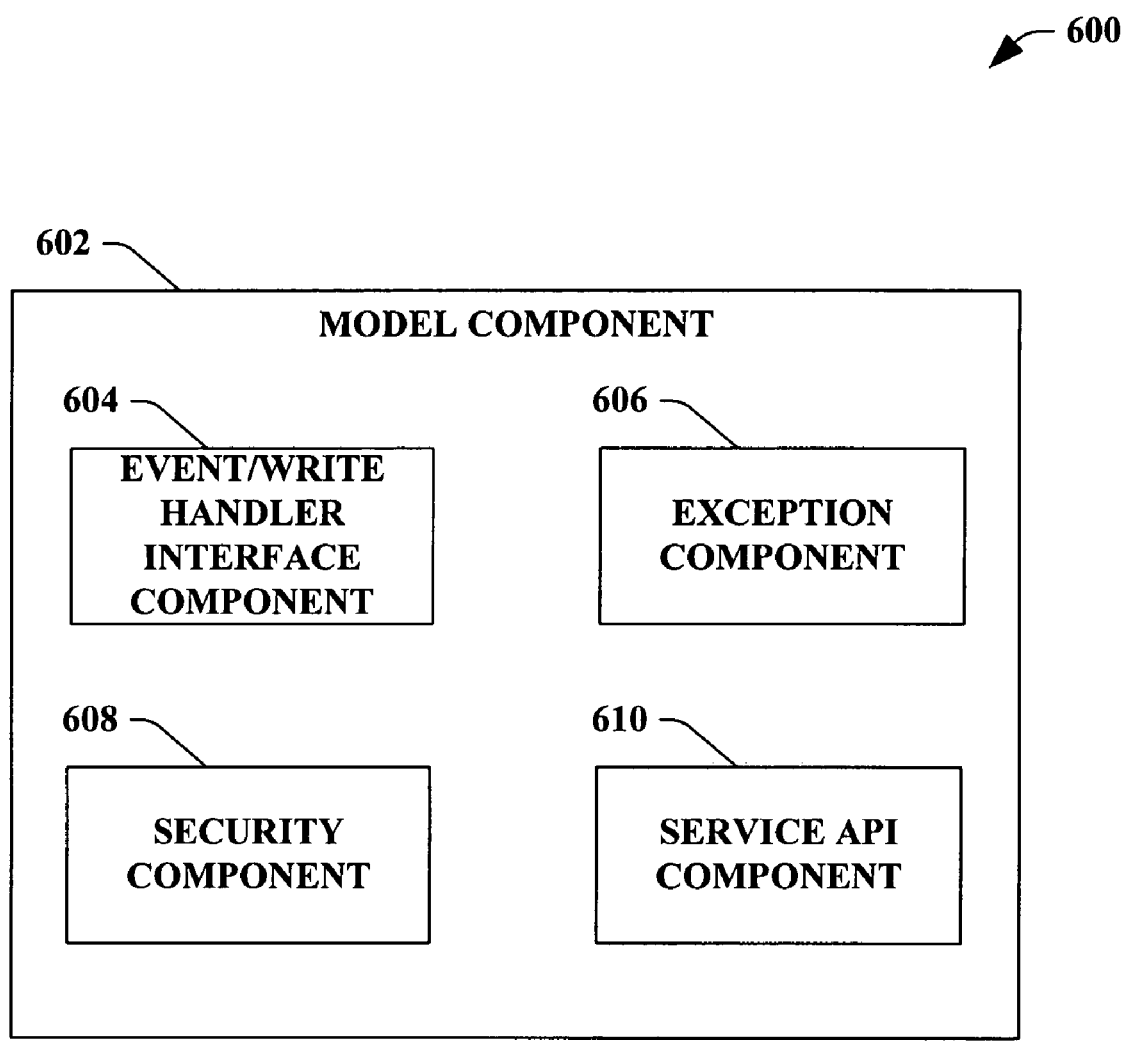
FIG. 6 illustrates a block diagram of an exemplary system that facilitates employing a model that utilizes an interface, a service API, an exception, and security.

FIG. 6 illustrates a system 600 that facilitates employing a model that can be utilized to create and/or execute an RFID process. A model component 602 can be employed to create the model (not shown), wherein a user and/or an end user can create the RFID process in a generic operation and/or a business specific scenario based on such model. It is to be appreciated and/or understood that the model component 602 can be substantially similar to the model component 502 of FIG. 5, 402 of FIG. 4, 202 of FIG. 2, and 104 of FIG. 1.

The model component 602 can include an event/write handler interface component 604 that can handle events from a logical source and/or send a command to devices based on the logical source. In particular, the event/write handler interface component 604 can utilize at least one interface to handle events from the logical source and/or send the command based on the logical source. For example, an interface referenced by "IEventHandler" can be instantiated with a structure referenced "ParameterMetaData" and "ParameterData" by utilizing the following code:

```
public struct ParameterMetaData {
    private string name;
    private System.Type type;
    private IComparable lowerRange;
    private IComparable higherRange;
}
```

-continued

```
public struct ParameterData {
    private string name;
    private object data;
}
public interface IEventHandler {
    ParameterMetaData[] GetParmameterMetaData( );
    void Init(ParameterData[] data, IContainer container);
    GenericEvent[] HandleGenericEvent(GenericEvent
        genericEvent);
    GenericEvent[] HandleTagReadEvent(TagReadEvent
        tagReadEvent);
    GenericEvent[] HandleTagListReadEvent(TagListReadEvent
tagListReadEvent);
    GenericEvent[] HandleReaderUpEvent(ReaderUpEvent
        readerUpEvent);
    GenericEvent[] HandleReaderDownEvent(ReaderDownEvent
readerDownEvent);
}
```

It is to be appreciated that "ParameterMetaData" and "ParameterData" can be constructors, wherein "ParameterData" contains read only properties. Also, the constructor "ParameterData" can validate data against the meta data within "ParameterMetaData." Referring to "IEventHandler," a data array order will be substantially the same as the order returned by the function "GetParameterMetaData()." It is also to be understood that "EventHandler" can be an interface that acts on a tag read and/or event from a device collection.

In particular, the above code utilizes a "tagReadEvent" as an input parameter. The number of tags in a taglist can be modified to ensure that fewer and/or more tags are processed by the next component. Moreover, the "GenericEvent[]" array (e.g., an event that signifies an internal movement) is processed by at least one subsequent component. Based on the derived type of the event, it is passed to the appropriate function in the next component. For example, if the "GenericEvent" is "TagReadEvent," then it can be passed to the "HandleTagReadEvent()" function in the next component.

A class referenced by "EventBase" can be utilized in order to contain techniques to access event specific data. For instance, the following code can be utilized in conjunction to define parameters and/or references within the instantiation of the "IEventHandler" interface to access event specific data:

```
public class EventBase {
    private EventContext context;
    private object data; //event enhancements go here
}
public class GenericEvent : EventBase {
}
public class TagReadEvent : EventBase {
    private Tag tag;
}
public class TagListReadEvent : EventBase {
    private TagList tagList;
}
public class PlatformManagementEvent {
}
public class ReaderUpEvent : PlatformManagementEvent {
    private string readerName;
}
public class ReaderDownEvent : PlatformManagementEvent {
    private string readerName;
}
```

Furthermore, the event/write handler interface component can utilize the following code to implement the write handler interface:

```
public interface IWriteHandler{
    ParameterMetaData[] GetParmameterMetaData( );
    void Init(ParameterData[] data, IContainer container);
}
```

The model component 602 can include an exception component 606 that provides at least one of an exception and/or a timeout for an application component. For example, the exceptions and/or timeouts can be handled by calling a "Dispose()" method within an "IDisposable" interface on that particular component. It is to be appreciated that the exceptions defined by components implementing the interfaces discussed supra should derive from "RfidException." For instance, the following code can be utilized in order to facilitate providing exceptions and/or timeouts in association to an RFID process:

```
public class RfidException : ApplicationException {
    public RfidException (string desc) : base(desc) {}
    public RfidException (Exception e) : base("Rfid Exception", e) {}
}
public class InitFailedException : RfidException {...}
```

The exceptions and/or timeouts above are appreciated to be common to more than one interface discussed supra. Moreover, the exceptions and/or timeouts can be thrown by a component that supports at least one of the following: a filter (e.g., IFilter), an alert (e.g., IAlert), an action (e.g., IAction), a tag data source such as "ITagDataSource" (e.g., when the initial method is called), etc.

Furthermore, the model component 602 can include a security component 608 that provides a security model. The security component 608 can provide a user account that can execute in connection with an operating system service. The user account can utilize a privilege in order to access at least one resource, wherein a resource can be, but is not limited to, a registry, a file system, a store, a sink database, etc. In one example, the privilege associated to the security component 608 does not allow an external component (e.g., an event handler, a write handler, a rules engine (RE), . . . ) to inherit the privileges associated to the user account. In this example, the external component can be given minimal privileges to execute code. For instance, the following permissions will not be given: permission to execute unmanaged code; access to the file system and/or registry; direct access to a device; etc. It is to be appreciated and understood that if the external component requires special privileges to access a resource, the privileges can be obtained on an individual basis. For instance, a username and/or a password of a user can be associated to privileges allowing the access to such resources.

Still referring to FIG. 6, the model component 602 can provide a service API component 610 to implement class definitions for at least one API in the RFID framework exposed as a web service. The service API component 610 can employ, but is not limited to, a store (e.g., storing a device object, list of device objects, device attributes, binding information, device names, . . . ), a device handler (e.g., checking the device information represents a valid device), a process manager (e.g., starting and/or stopping of a process and/or a concerned process), a server manager (e.g., managing an RFID server and/or setting a reader property), a provider manager (e.g., identifying loaded providers; providing one of a supported meta data, a default property profile, an override of default profile, a property profile with the most current settings, . . . ), a component manager (e.g., returning at least one of a list of published and/or deployed policy names, a list of write handler assemblies; registering at least one of an event handler assembly, a write handler assembly, . . . ), etc.

Figure 7:
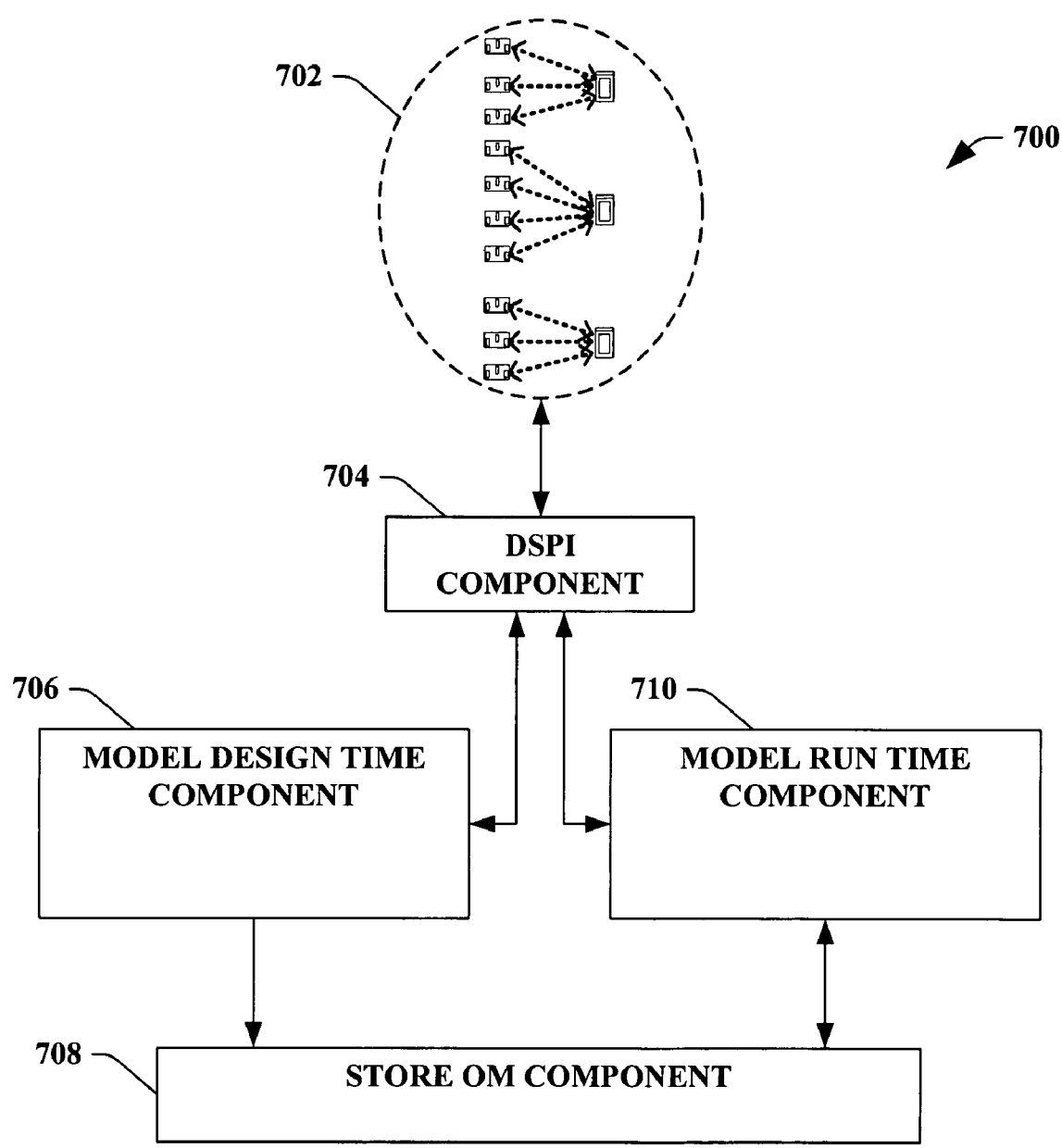
FIG. 7 illustrates a block diagram of an exemplary system that facilitates employing a model to create and utilize an RFID process.

FIG. 7 illustrates a system 700 that facilitates employing a model that can be utilized during a design time and/or a run time to create and/or execute an RFID process/application. A device service provider interface (DSPI) 704 can provide uniform communication to and/or from a physical/technical architecture 702. The physical/technical architecture 702 can be a configuration of at least one physical device utilizing RFID and/or a tag. The DSPI 704 can receive and/or transmit data to the physical/technical architecture 702 via a device-host protocol. It is to be appreciated that the DSPI 704 can utilize, but is not limited to, wire and/or wireless networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

A model design time component 706 can interact with the DSPI 704 to create and/or store the RFID process that is utilized in conjunction with the physical/technical architecture 702. The model design time component 706 can create a programming model and/or a framework that can be utilized to build the RFID process/application. It is to be appreciated that the design time component 706 can create and/or store at least one RFID process, wherein the RFID process is stored in a store OM component 708. The store OM component 708 can further be utilized to transmit such RFID process, which is implemented by a model run time component 710. The model run time component 710 can execute the RFID process created by the model design time component 706. Moreover, a substantially similar programming model and/or the framework can be utilized throughout the design time and/or run time to create and execute a particular RFID process that is to be associated with the physical/technical architecture 702. As depicted, the model run time component 710 can utilize the DSPI 704 to communicate and/or receive data allowing the execution of the RFID process on at least one physical device within the physical/technical architecture 702.

Figure 8:
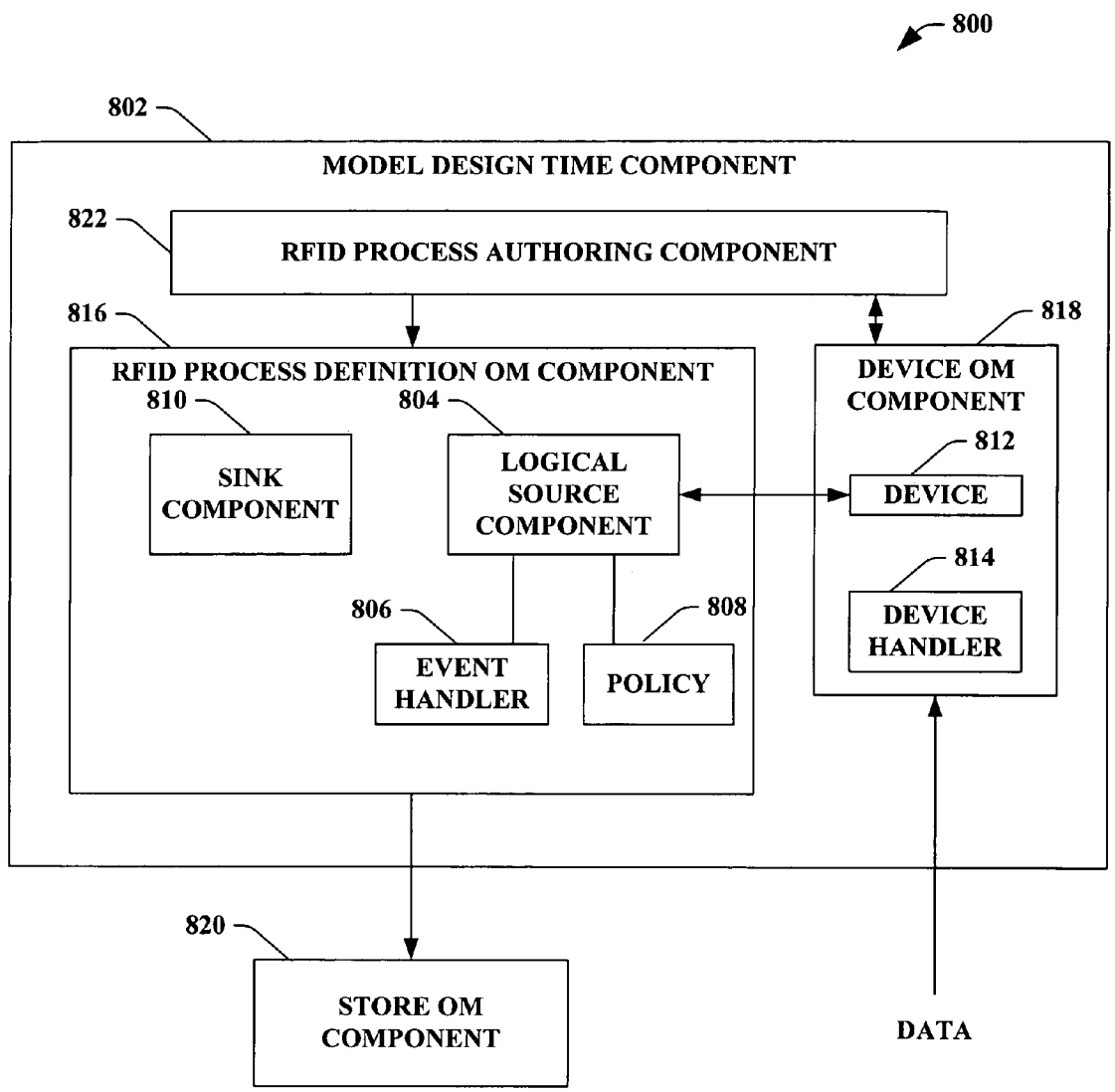
FIG. 8 illustrates a block diagram of an exemplary system that facilitates utilizing a model during design time.

FIG. 8 illustrates a system 800 that facilitates utilizing a model during a design time. A model design time component 802 can create the model, utilizing an architecture described herein. The system 800 depicts a component architecture of a framework for an RFID process to be created and/or stored, wherein at least one component is at least one of the following: implemented by the framework, provided by the framework, and/or plugged-in the framework. In particular, the following: (which have been discussed supra) a logical source component 804, an event handler 806, a policy 808, a sink component 810, a device 812, and a device handler 814 can be used for implementation of the framework. An RFID process definition OM component 816, device OM component 818 and a store OM component 820 (all discussed supra) can be provided by the framework. While, an RFID process authoring component 822 can be a plug-in component into the framework.

Figure 9:
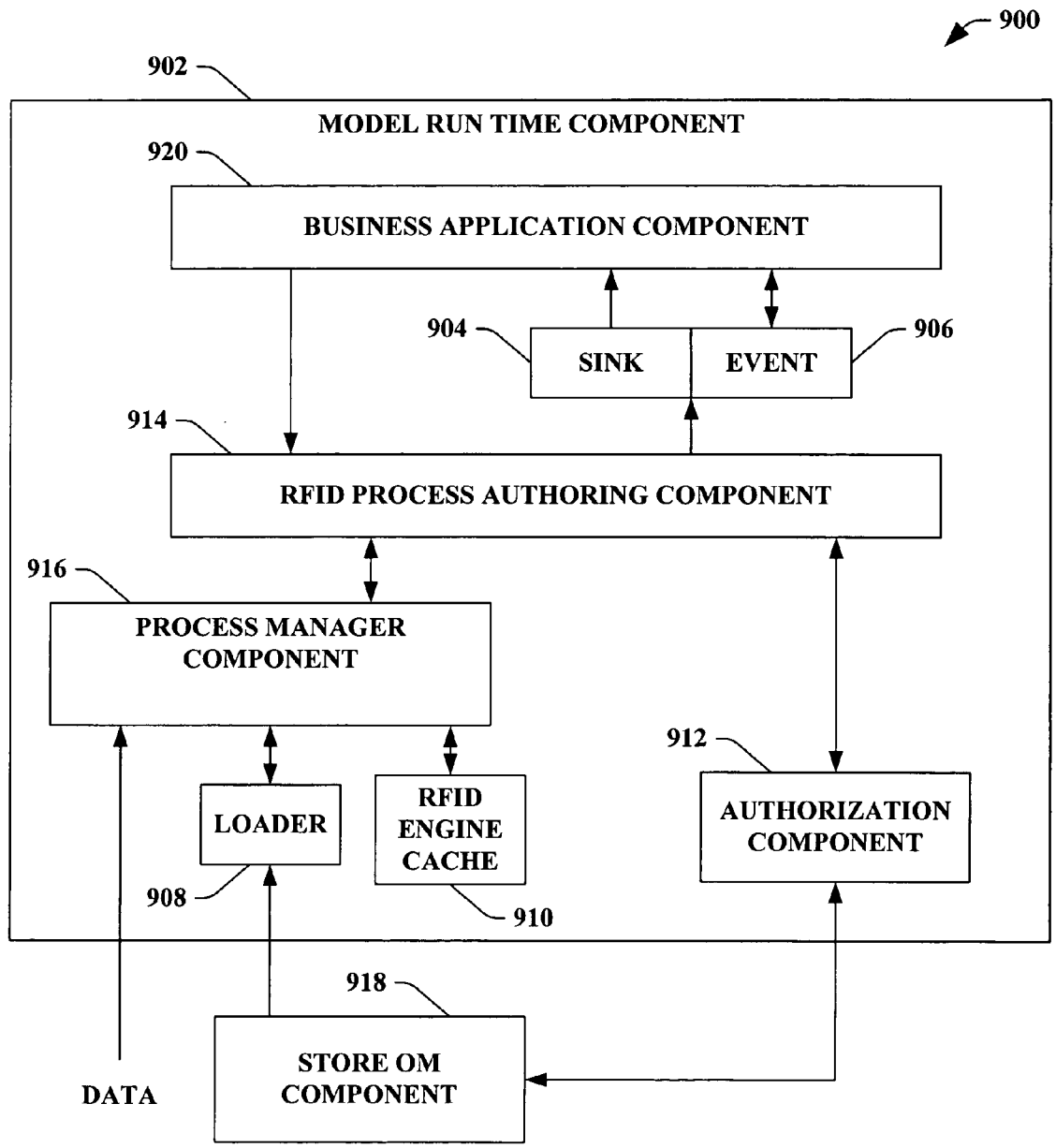
FIG. 9 illustrates a block diagram of an exemplary system that facilitates utilizing a model during run time.

FIG. 9 illustrates a system 900 that facilitates utilizing a model during a run time. A model run time component 902 can create the model, utilizing an architecture described herein. The system 900 illustrates a component architecture framework for an RFID process to be retrieved and/or executed, wherein at least one component is at least one of the following: implemented by the framework, provided by the framework, and/or plugged-in the framework. In particular, the following: (which have all been discussed supra) a sink 904, an event 906, a loader 908, an RFID engine cache 910, and an authorization component 912 can be utilized for implementation of the framework. An RFID process authoring component 914, a process manager component 916, and a store OM component 918 (all discussed supra) can be provided by the framework. While, a business application component 920 can be a plug-in component into the framework.

Figure 10:
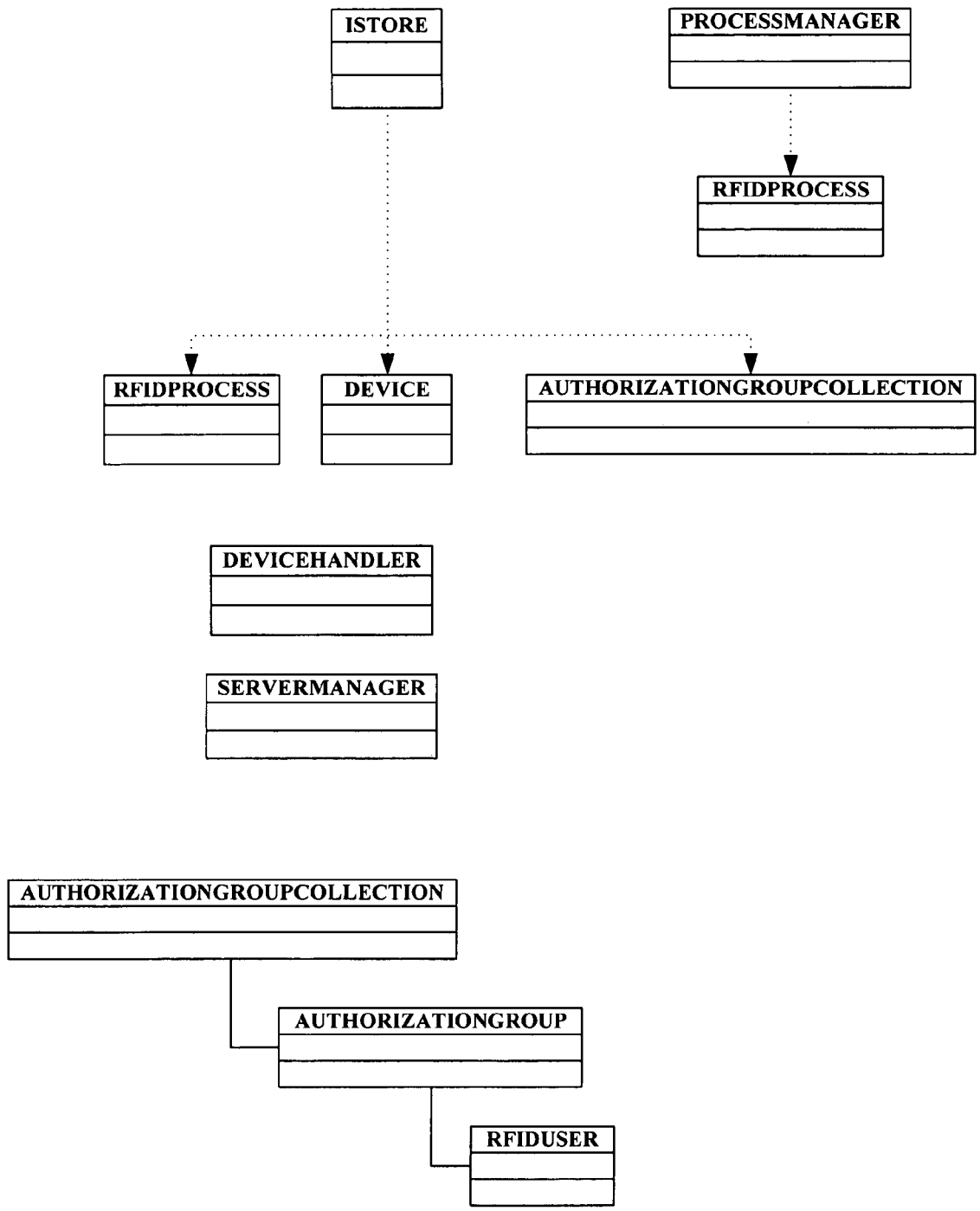
FIG. 10 illustrates a block diagram of an exemplary system that facilitates implementing a hierarchical framework of classes based on a model to create an RFID application.
Figure 11:
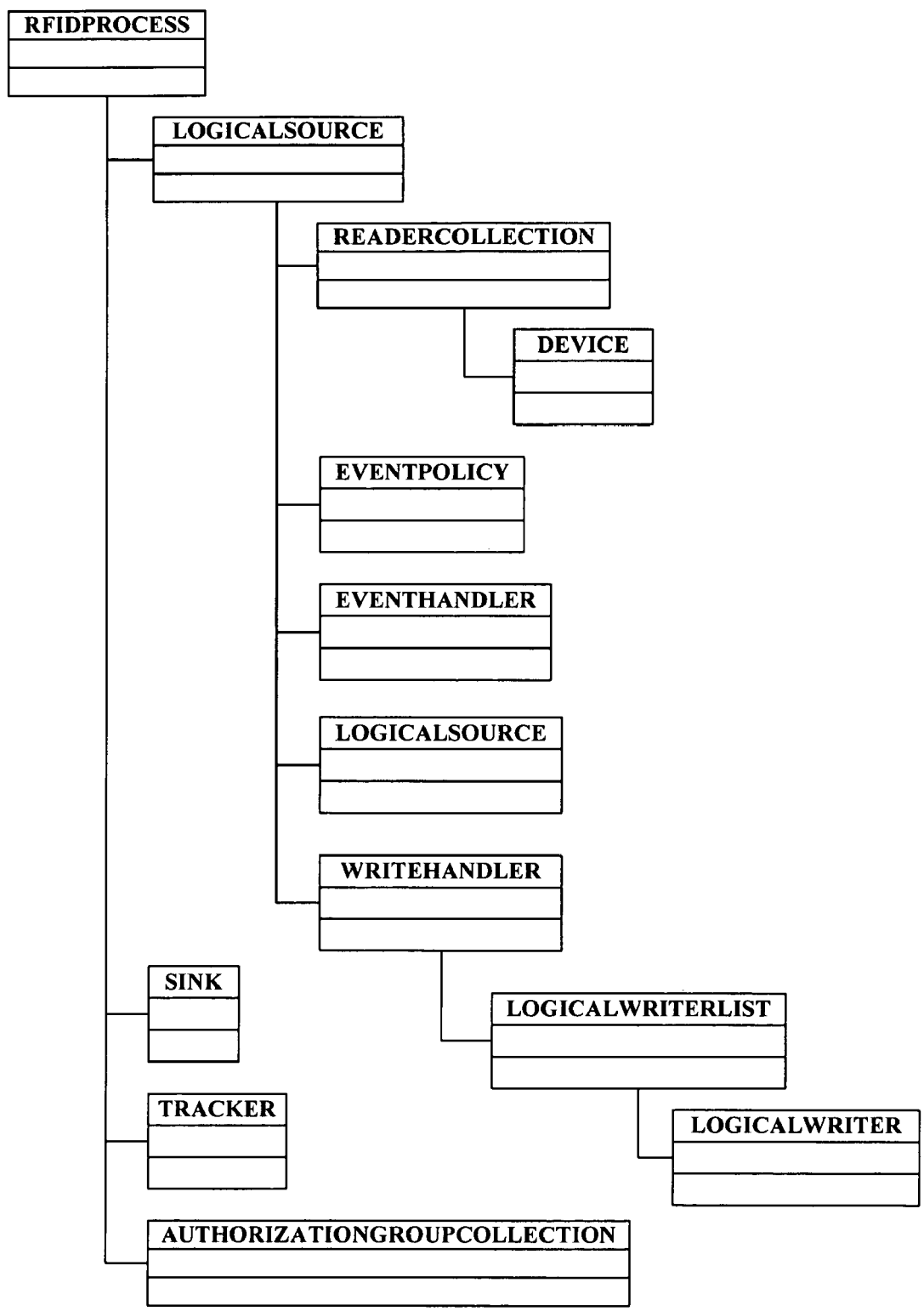
FIG. 11 illustrates a block diagram of an exemplary system that facilitates implementing a hierarchical framework of classes based on a model to create an RFID application.

FIG. 10 and FIG. 11 illustrate a class relationship and/or a hierarchical representation of RFID framework classes. The class relationships and/or the hierarchical representation of RFID framework classes in FIG. 10 and FIG. 11 can include, but are not limited to, the class relationships as seen in the table below:

| Class | Contains: |
|---|---|
| RfidProcess | 1 LogicalSource |
| | 1 Sink |
| | 0 . . . 1 Tracker |
| | 0 . . . 1 AuthorizationGroupCollection |
| ProcessManager | (starts/stops) 1 . . . N RfidProcess(s) |
| Store | 0 . . . N RfidProcess(s) |
| | 0 . . . N Device(s) |
| | 0 . . . N AuthorizationGroupCollection(s) |
| DeviceHandler | Used for discovery and configuration of Devices |
| LogicalSource | 0 . . . N LogicalSource(s) |
| | 1 . . . N ReaderCollection(s) |
| | 0 . . . N EventPolicy(s) |
| | 0 . . . 1 EventHandler |
| | 0 . . . 1 WriteHandler |
| DeviceCollection | 1 to N Device(s) |
| EventPolicy | Wrapper class for Filters and Alerts |
| EventHandler | Event handling logic |
| WriteHandler | 1 . . . N LogicalWriteList |
| LogicalWriterList | 1 . . . N LogicalWriter(s) |
| LogicalWriter | 1 Device |
| AuthorizationGroupCollection | 0 . . . N AuthorizationGroup |
| AuthorizationGroup | 0 . . . N RfidUser |
| RfidUser | Contains 1or more users and/or groups in an operating system service |

Figure 12:
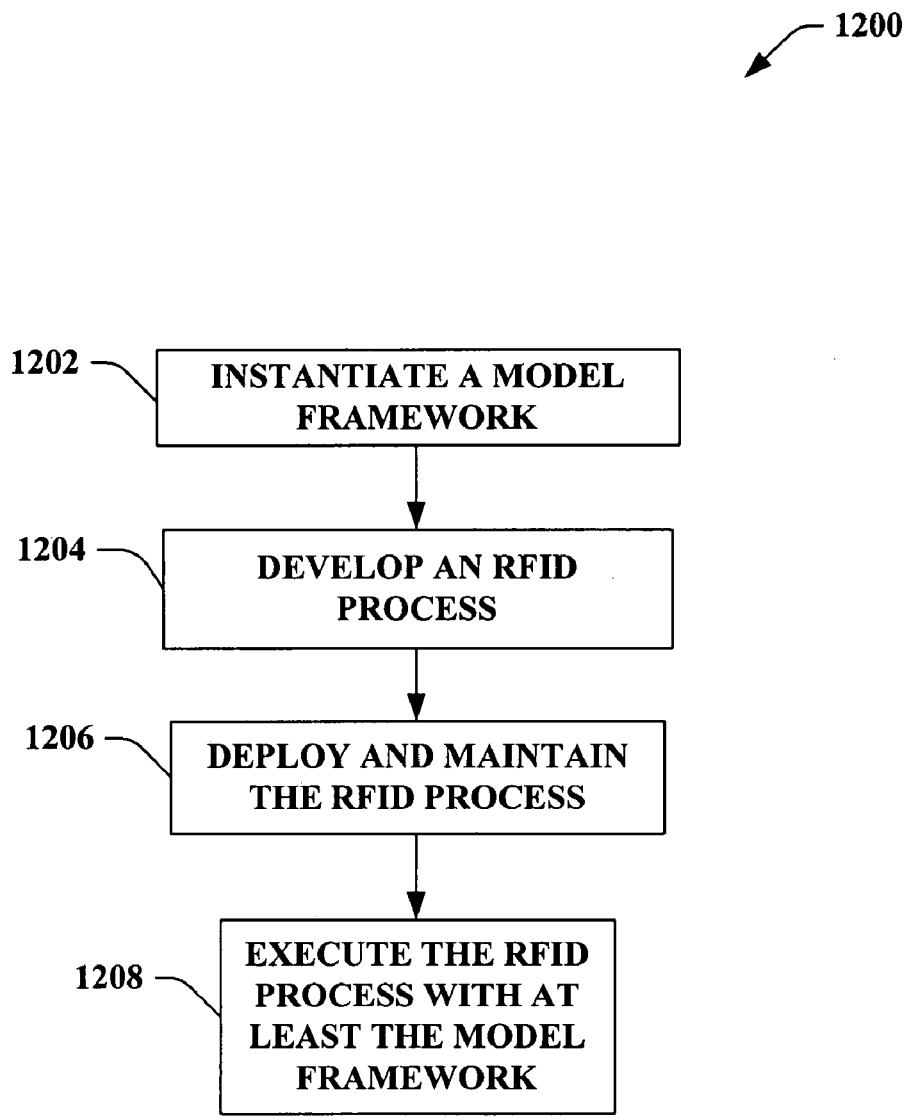
FIG. 12 illustrates an exemplary flow chart for employing a model framework to develop and create an RFID process.
Figure 13:
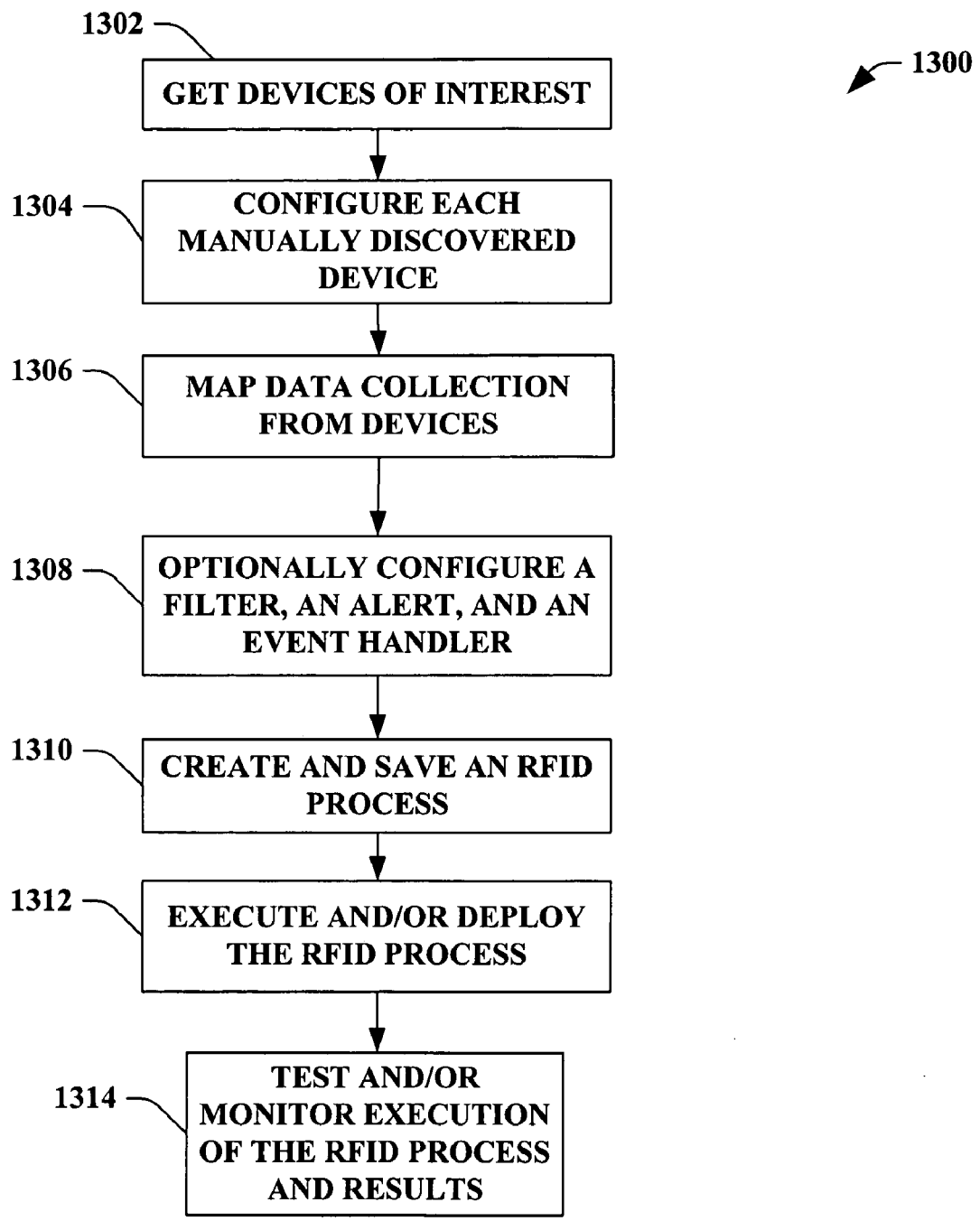
FIG. 13 illustrates an exemplary flow chart for creating an RFID process.

FIGS. 12-13 illustrate methodologies in accordance with the subject invention. For simplicity of explanation, the methodologies are depicted and described as a series of acts. It is to be understood and appreciated that the subject invention is not limited by the acts illustrated and/or by the order of acts, for example acts can occur in various orders and/or concurrently, and with other acts not presented and described herein. Furthermore, not all illustrated acts may be required to implement the methodologies in accordance with the subject invention. In addition, those skilled in the art will understand and appreciate that the methodologies could alternatively be represented as a series of interrelated states via a state diagram or events.

FIG. 12 illustrates a methodology 1200 that facilitates utilizing a framework to provide a programming model to create and/or execute an RFID process. The programming model can be utilized during a design time, from which the RFID process can be created and stored. When the RFID process is to be executed, the RFID process can be uploaded from storage (e.g., disk) and/or directly implemented upon creation. Thus, the RFID process is created and executed utilizing the programming model during design time and run time respectively.

At reference numeral 1202, a model framework is instantiated utilizing at least received data. The received data can be, but is not limited to, an external input (e.g., end-user input, application developer input, etc.), a device related data (e.g., antennae data, configuration data, an identification, an address, a version, etc., a provider related data, tag data, a device collection, a filter policy, an alert policy, a logical source, an event handler, an event, . . . . Additionally, it is to be appreciated that the framework can include, but is not limited to, an entity (e.g., a device, a logical source, a filter policy, an alert policy, an event handler, a tracker, a write handler, an RFID process object, a store, etc.), a framework class, a hierarchical framework of at least one class, an interface, an exception, a component architecture, a schema, an object model, an application programming interface (API), etc. In accordance with one aspect of the subject invention, the model framework can include a component architecture providing at least one of the following: a component that is implemented by the framework; a component that is provided by the framework; and a component that is plugged into the framework (e.g., a component that is exposed as an interface and can be implemented as desired to suit application specific scenarios). It is to be appreciated and understood that the model framework is not limited to the component architecture described above.

At reference numeral 1204, an RFID process is generated. The RFID process development involves device setup and/or configuration, wherein devices can be discovered by a process that is automatic, manual, and/or combination thereof. Additionally, a logical device collection (e.g., a logical reader collection, a logical writer collection, logical writers, . . . ) is created in the context of the RFID process. For instance, the logical device collection can be user defined during design time. Next within the development of the RFID process, a device collection (e.g., a reader collection, a writer collection, a printer collection, . . . ) is grouped into a logical source, which has additional optional constructs such as, but not limited to, a filter, an alert, an event handler. The RFID process is then created by associating devices and the top level logical source with the RFID process. In accordance with one aspect of the subject invention, tracking levels can be specified, and/or tracking options/logging levels can be executed for the RFID process.

The RFID process is deployed and maintained at reference numeral 1206. The RFID process is deployed by utilizing a mapping of a logical entity in the RFID process to a physical entity. It is to be appreciated that the logical entities can be, but are not limited to, a device collection, a reader collection, a logical writer, etc. Moreover, it is to be appreciated that the physical entities can be, but are not limited to, a device, a reader, a writer, a printer, etc. The mapping of the logical entities to the physical entities can include one of the following: the logical device collection within the RFID process mapping to the physical devices; the logical reader collection within the RFID process mapping to the physical reader devices; the logical writers within the RFID process mapping to the physical writer devices; etc. Furthermore, maintenance is provided to the RFID process by managing the processes throughout a lifetime.

The RFID processes can be started and/or stopped using a manager. It is to be appreciated that if the RFID process is running, it can be stopped, changed, and restarted while the sewer is running.

At reference numeral 1208, the RFID process is executed by utilizing the model framework. Thus, the model framework is utilized during the design time creation of the RFID process and the run time execution of the RFID process. The execution of the RFID process entails processing information coming from the physical devices within a device collection. The processing can be passing an event through a component in the logical source. It is to be appreciated that the event handler can enrich and/or transform incoming data with additional fields/custom fields to generate additional real-time events. Moreover, the event handler can write tag information when a tag is detected.

It is to be appreciated that the subject invention can provide an RFID process lifecycle. First, a logical source with at least one of a device collection, an event policy, and an event handler is created. Next, a custom component such as a policy and/or event handler can be implemented. Then, the logical source(s) can be connected together to create a process with a tracker, and/or security options. The device(s) can be configured, reader collections can bind in the process to a physical device, and then deployed. The information can be retrieved from the executing process/processes, managed device, and/or process. Moreover, the processes can be re-configured with dynamic policy morphing (e.g., during the running of a process).

FIG. 13 illustrates a methodology 1300 that facilitates creating an RFID process utilizing a model framework that incorporates at least one framework concept. At reference numeral 1302, a device of interest is obtained from a server. The device of interest can be, but is not limited to, a device that has a custom property profile. In accordance to one aspect of the subject invention, the device can be obtained and/or discovered by an automatic discovery. For example, a device can transmit a signal to signify it is available. Thus, the server can receive the signal and be notified that the device is available. In accordance with another aspect of the subject invention, the discovery can be a manual configuration. For example, a configuration file can be utilized to load a device configuration, and utilize the device in the RFID process definition. Alternatively, the device can be individually loaded into a server store utilizing a store mechanism (e.g., assuming a physical deployment of devices that mirror device configuration is present at run time). Whether automatic discovery or manual configuration is employed, once discovered, the RFID application can receive information from the devices in which it has an interest. At 1304, respective manually discovered devices (for which a customized property profile is to be set) are configured. Such configuration can include, but is not limited to, a reader identity (e.g., name/ID, location), a read/write setting, data acquisition parameters, a basic read filter bit pattern, a smoothing/event generation parameter, and/or a custom property. It is to be appreciated that these operations can be achieved by programmatically utilizing a device OM component as discussed supra. Next at reference numeral 1306, data collection is mapped out from the device. Thus, data collection from the device is mapped out and processed through, for instance, a logical device collection, a logical reader collection, a logical writer collection, etc. Once the mapping of data collection is processed, it is represented in a logical source. Next at reference numeral 1308, optional configuration and/or association is employed. A filter can be optionally configured and associated to the logical source via a filter policy. Additionally, an alert can be configured and associated via an alert policy. At least one available event handler can be configured and associated to the logical source.

At reference numeral 1310, the RFID process is created and/or stored. The RFID process can be created by bringing the logical source and devices together to represent a single entity. It is to be appreciated and understood that an available tracker can be utilized to specify the tracking option for the RFID process. Once created, the RFID process can be stored and/or saved to a store. Moreover, it is to be appreciated that reference numerals 1306, 1308, 1310 can be achieved by utilizing the RFID process definition OM component discussed supra. Next, reference numeral 1312 executes and/or deploys the RFID process. The execution and/or deployment can include one or more RFID processes created based upon a model framework. Furthermore, the execution and/or deployment entails setting the mapping from the logical entities in the RFID process to the physical devices. At 1314, the execution of the RFID process can be tested and/or monitored. For example, a test can provide simulated data input and observe an output execution stream. In another instance, execution results can be monitored such as, but not limited to, an RFID process execution trail, an error, an exception, a device health event, etc.

Figure 14:
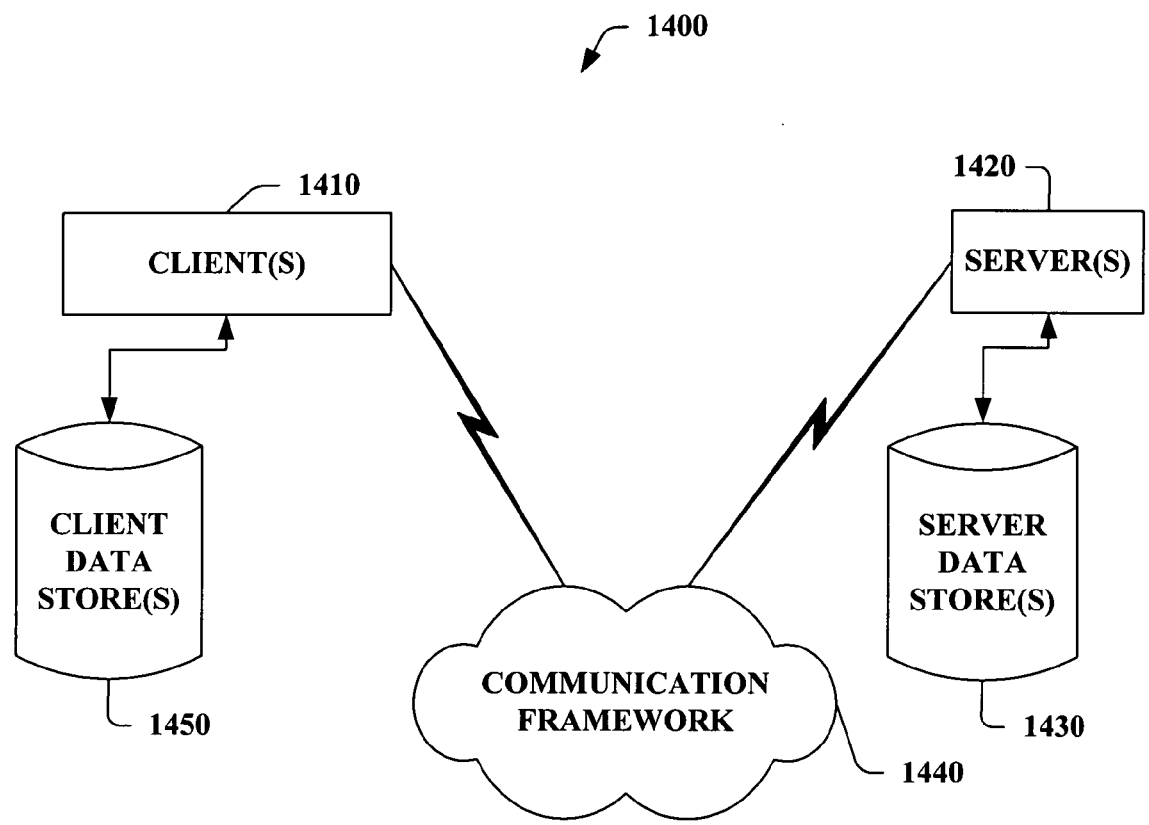
FIG. 14 illustrates an exemplary networking environment, wherein the novel aspects of the subject invention can be employed.
Figure 15:
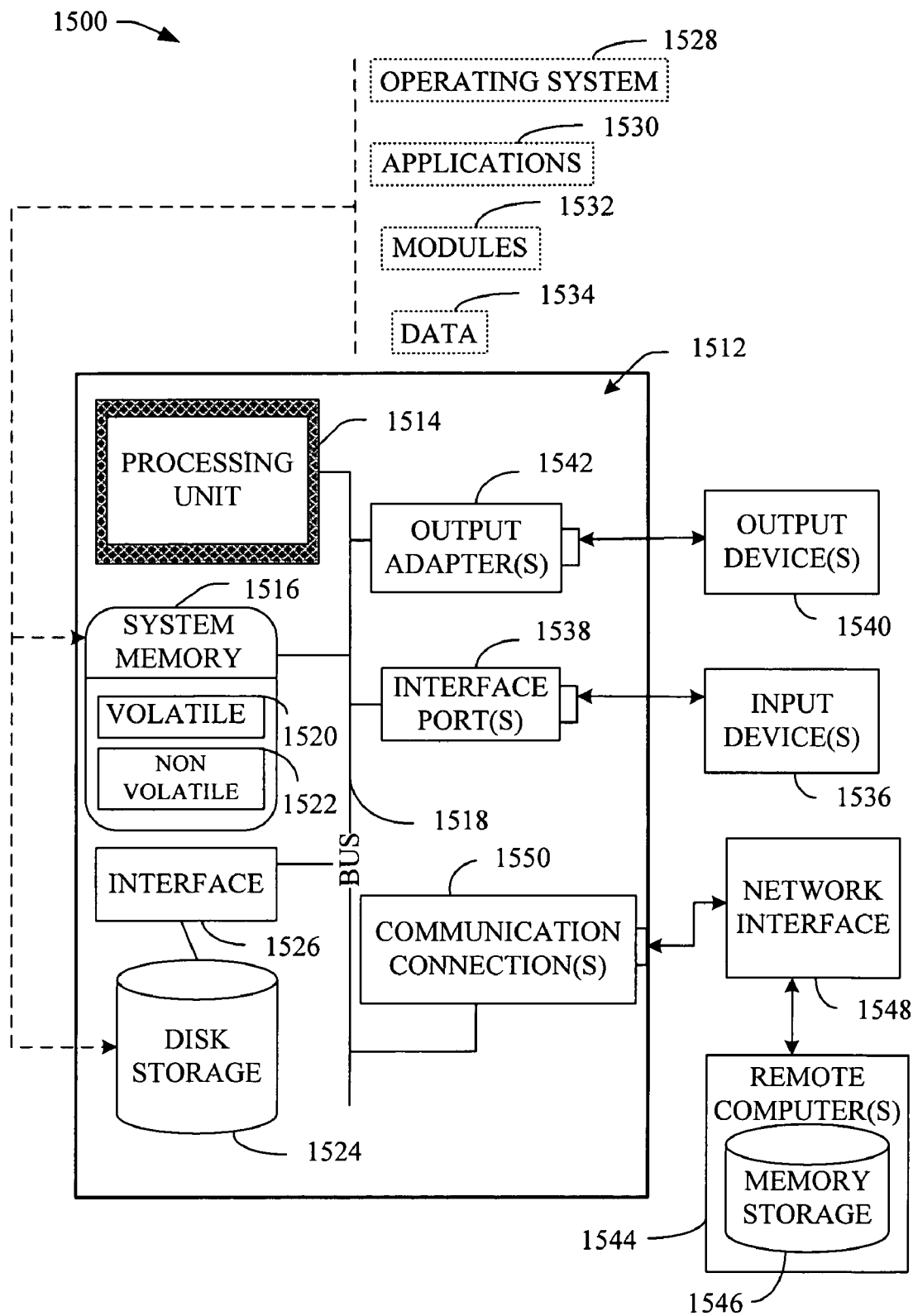
FIG. 15 illustrates an exemplary operating environment that can be employed in accordance with the subject invention.

In order to provide additional context for implementing various aspects of the subject invention, FIGS. 14-15 and the following discussion is intended to provide a brief, general description of a suitable computing environment in which the various aspects of the subject invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local and/or remote memory storage devices.

FIG. 14 is a schematic block diagram of a sample-computing environment 1400 with which the subject invention can interact. The system 1400 includes one or more client(s) 1410. The client(s) 1410 can be hardware and/or software (e.g., threads, processes, computing devices). The system 1400 also includes one or more server(s) 1420. The server(s) 1420 can be hardware and/or software (e.g., threads, processes, computing devices). The servers 1420 can house threads to perform transformations by employing the subject invention, for example.

One possible communication between a client 1410 and a server 1420 can be in the form of a data packet adapted to be transmitted between two or more computer processes.

The system 1400 includes a communication framework 1440 that can be employed to facilitate communications between the client(s) 1410 and the server(s) 1420. The client(s) 1410 are operably connected to one or more client data store(s) 1450 that can be employed to store information local to the client(s) 1410. Similarly, the server(s) 1420 are operably connected to one or more server data store(s) 1430 that can be employed to store information local to the servers 1440.

With reference to FIG. 15, an exemplary environment 1500 for implementing various aspects of the invention includes a computer 1512. The computer 1512 includes a processing unit 1514, a system memory 1516, and a system bus 1518. The system bus 1518 couples system components including, but not limited to, the system memory 1516 to the processing unit 1514. The processing unit 1514 can be any of various available processors. Dual microprocessors and other multiprocessor architectures also can be employed as the processing unit 1514.

The system bus 1518 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1516 includes volatile memory 1520 and nonvolatile memory 1522. The basic input/output system (BIOS), containing the basic routines to transfer information between elements within the computer 1512, such as during start-up, is stored in nonvolatile memory 1522. By way of illustration, and not limitation, nonvolatile memory 1522 can include read only memory (ROM), programmable ROM (PROM), electrically programmable ROM (EPROM), electrically erasable programmable ROM (EEPROM), or flash memory. Volatile memory 1520 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1512 also includes removable/non-removable, volatile/non-volatile computer storage media. FIG. 15 illustrates, for example a disk storage 1524. Disk storage 1524 includes, but is not limited to, devices like a magnetic disk drive, floppy disk drive, tape drive, Jaz drive, Zip drive, LS-100 drive, flash memory card, or memory stick. In addition, disk storage 1524 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1524 to the system bus 1518, a removable or non-removable interface is typically used such as interface 1526.

It is to be appreciated that FIG. 15 describes software that acts as an intermediary between users and the basic computer resources described in the suitable operating environment 1500. Such software includes an operating system 1528. Operating system 1528, which can be stored on disk storage 1524, acts to control and allocate resources of the computer system 1512. System applications 1530 take advantage of the management of resources by operating system 1528 through program modules 1532 and program data 1534 stored either in system memory 1516 or on disk storage 1524. It is to be appreciated that the subject invention can be implemented with various operating systems or combinations of operating systems.

A user enters commands or information into the computer 1512 through input device(s) 1536. Input devices 1536 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1514 through the system bus 1518 via interface port(s) 1538. Interface port(s) 1538 include, for example, a serial port, a parallel port, a game port, and a universal serial bus (USB). Output device(s) 1540 use some of the same type of ports as input device(s) 1536. Thus, for example, a USB port may be used to provide input to computer 1512, and to output information from computer 1512 to an output device 1540. Output adapter 1542 is provided to illustrate that there are some output devices 1540 like monitors, speakers, and printers, among other output devices 1540, which require special adapters. The output adapters 1542 include, by way of illustration and not limitation, video and sound cards that provide a means of connection between the output device 1540 and the system bus 1518. It should be noted that other devices and/or systems of devices provide both input and output capabilities such as remote computer(s) 1544.

Computer 1512 can operate in a networked environment using logical connections to one or more remote computers, such as remote computer(s) 1544. The remote computer(s) 1544 can be a personal computer, a server, a router, a network PC, a workstation, a microprocessor based appliance, a peer device or other common network node and the like, and typically includes many or all of the elements described relative to computer 1512. For purposes of brevity, only a memory storage device 1546 is illustrated with remote computer(s) 1544. Remote computer(s) 1544 is logically connected to computer 1512 through a network interface 1548 and then physically connected via communication connection 1550. Network interface 1548 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1550 refers to the hardware/software employed to connect the network interface 1548 to the bus 1518. While communication connection 1550 is shown for illustrative clarity inside computer 1512, it can also be external to computer 1512. The hardware/software necessary for connection to the network interface 1548 includes, for exemplary purposes only, internal and external technologies such as, modems including regular telephone grade modems, cable modems and DSL modems, ISDN adapters, and Ethernet cards.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that facilitates utilizing an RFID process, comprising:
    a component that receives data at design time, the data related to at least one of a device, or a programmable input; and
    a model component that utilizes the received data to create a framework to build the RFID process at design time and execute the RFID process at run time, the framework includes at least one of an entity, an object model, a class hierarchical structure, and an API.

2. The system of claim 1, the entity is at least one of the following: a logical source; a logical source including a device; a device; a filter policy; an alert policy; an event handler; a write handler; a store; and the RFID process.

3. The system of claim 2, the device is at least one of the following: an RFID reader; an RFID writer; an RFID printer; a printer; a reader; a writer; an RFID compatible device; an RFID transmitter; an antenna; a sensor, a real time device; and an RFID receiver.

4. The system of claim 2, the logical source combines at least one of a device collection, a filter, an alert, an event handler, and an additional logical source.

5. The system of claim 2, the logical source represents at least one of the following: a stream of data from a physical device on a server common to the at least one entity, and a processing of tag data within the RFID process.

6. The system of claim 2, the filter policy is a group of logical constructs executed on incoming raw data stream specified on the logical source via a set of logical rules that can allow a list of valid tags.

7. The system of claim 2, the alert policy is a group of logical rule sets that are evaluated against a data stream to enact at least one action, wherein the action is at least one of the following: execute an alarm; alert an appropriate authority; lock a location; execute an audible siren; execute a text message; execute an email; execute a light; execute a motion; and
execute a video.

8. The system of claim 1, the framework provides the definition of a logical layout of processing that represents a logical process, wherein the logical process can bind to a physical device at runtime to provide a clean separation of a logical model and physical model.

9. The system of claim 2, the event handler handles an event from the logical source to provide at least one of the following: enrich an event stream; and generate an additional event with a business context.

10. The system of claim 2, the write handler provides the RFID process to send a command to a device one of the following: an external input and an event from the logical source.

11. The system of claim 2, the store represents a mechanism to contain the entity, the RFID process, and a mapping from the entity in the RFID process to the device.

12. The system of claim 1, the object model is at least one of the following: an RFID process definition object model (OM) that allows the creation and storage of the RFID process; a discovery OM that obtains meta data of a device of various types of a provider in a form of property meta data and verifies a device validity; an RFID process execution OM that allows the deployment of the RFID process; a store OM that provides a uniform API to store, retrieve, and delete a stored entity; a server manager OM that provides modification to at least one setting of a server; and an authorization OM that provides authorization in relation to access of one of the RFID process and the device.

13. The system of claim 1, the model further comprising at least one of the following: an exception; a timeout; a security component that provides a security service based on a user account and an associated privilege on an operating system service; a handler interface that employs an interface that can be utilized to implement one of sending a command to a device to write, and handling an event from a logical source; and a service API component.

14. The system of claim 13, the service API component that defines at least one of the following API's in the model to be exposed as a web service: a store; a device handler; a process manager; a server manager; a provider manager; and a component manager.

15. A computer readable medium having stored thereon the components of the system of claim 1.

16. A computer-implemented method that facilitates utilizing an RFID process, comprising:
    instantiating a framework utilizing a data received at design time and a framework concept;
    developing the RFID process utilizing the framework at design time;
    deploying and maintaining the RFID process via the framework; and
    executing the RFID process with the framework at run time.

17. The method of claim 16, further comprising:
    obtaining a device;
    configuring the device;
    mapping data collection from the device;
    creating the RFID process by combining a logical source and the device to represent a single entity; and
    setting the mapping from the entity in the RFID process to a physical device.

18. The method of claim 17, farther comprising:

discovering the device of interest by one of an automatic discovery and a manual discovery;

configuring one of a filter, an alert, an event handler, and a write handler; and saving the RFID process.

19. A data packet that communicates between a receiver component and the model component, the data packet facilitates the method of claim 16.

20. A computer-implemented system that facilitates implementing an RFID process, comprising:

means for receiving data at design time, the data related to one of a device, a provider, a programmable input;

means for creating a model based upon the received data that can be utilized to build an RFID process at design time; and means for utilizing the model to execute the RFID process at run time.

* * * * *